(12) United States Patent
Walczak et al.

(10) Patent No.: US 12,458,612 B2
(45) Date of Patent: Nov. 4, 2025

(54) COMBINATION THERAPY COMPRISING COMPOUNDS OF FORMULA (I) AND GLP-1 RECEPTOR AGONISTS

(71) Applicant: GENFIT, Loos (FR)

(72) Inventors: Robert Walczak, Lille (FR); Vanessa Legry, Emmerin (FR); Emeline Descamps, Gondecourt (FR)

(73) Assignee: GENFIT, Loos (FR)

( * ) Notice: Subject to any disclaimer, the term of this patent is extended or adjusted under 35 U.S.C. 154(b) by 738 days.

(21) Appl. No.: 17/602,296

(22) PCT Filed: Apr. 9, 2020

(86) PCT No.: PCT/EP2020/060283
§ 371 (c)(1),
(2) Date: Oct. 8, 2021

(87) PCT Pub. No.: WO2020/208205
PCT Pub. Date: Oct. 15, 2020

(65) Prior Publication Data
US 2022/0362187 A1    Nov. 17, 2022

(30) Foreign Application Priority Data
Apr. 10, 2019   (EP) ..................... 19305468

(51) Int. Cl.
| A61K 31/192 | (2006.01) |
| A61K 38/26 | (2006.01) |
| A61P 1/16 | (2006.01) |
| A61P 3/10 | (2006.01) |

(52) U.S. Cl.
CPC ............ *A61K 31/192* (2013.01); *A61K 38/26* (2013.01); *A61P 1/16* (2018.01); *A61P 3/10* (2018.01)

(58) Field of Classification Search
CPC .............................. A61K 31/192; A61K 38/26
See application file for complete search history.

(56) References Cited

U.S. PATENT DOCUMENTS

| 9,115,073 B2 | 8/2015 | Dubernet et al. |
| 11,478,440 B2 | 10/2022 | Walczak et al. |
| 2003/0022816 A1* | 1/2003 | Knudsen ............ A61K 38/26 514/6.9 |
| 2017/0290812 A1 | 10/2017 | Darteil et al. |
| 2017/0290813 A1 | 10/2017 | Walczak et al. |
| 2017/0290814 A1 | 10/2017 | Dubernet et al. |
| 2019/0352715 A1 | 11/2019 | Darteil et al. |
| 2020/0121625 A1 | 4/2020 | Walczak et al. |
| 2020/0206169 A1 | 7/2020 | Walczak et al. |
| 2022/0056419 A1 | 2/2022 | Vidal et al. |
| 2022/0162702 A1 | 5/2022 | Brozek |
| 2022/0186313 A1 | 6/2022 | Majd |
| 2022/0241232 A1 | 8/2022 | Brozek et al. |
| 2022/0340962 A1 | 10/2022 | Majd |
| 2022/0401420 A1 | 12/2022 | Stankovic-Valentin et al. |
| 2022/0411874 A1 | 12/2022 | Darteil et al. |
| 2023/0039185 A1 | 2/2023 | Delhomel et al. |
| 2023/0296624 A1 | 9/2023 | Majd et al. |
| 2023/0323308 A1 | 10/2023 | Vidal et al. |
| 2024/0002939 A1 | 1/2024 | Hosmane et al. |
| 2024/0058288 A1* | 2/2024 | Shtilbans ............... A61P 25/16 |
| 2024/0282454 A1 | 8/2024 | Hajji et al. |

FOREIGN PATENT DOCUMENTS

| WO | WO 2011/064350 | 6/2011 |
| WO | WO 2018/193006 | 10/2018 |
| WO | WO 2020/127613 | 6/2020 |
| WO | WO 2023/194593 | 10/2023 |

OTHER PUBLICATIONS

Cariou et al. GFT505 for the treatment of nonalcoholic steatohepatitis and type 2 diabetes. Expert Opinion on Investigational Drugs. Aug. 28, 2014, vol. 23, No. 10, pp. 1441-1448. (Year: 2014).*
Fiorucci, S. et al. "Future trends in the treatment of non-alcoholic steatohepatitis" *Pharmacological Research*, 2018, pp. 289-298, vol. 134.
Stahl, E. P et al. "Nonalcoholic Fatty Liver Disease and the Heart" *Journal of the American College of Cardiology*, Mar. 5, 2019, pp. 949-963, vol. 73, No. 8.
Written Opinion in International Application No. PCT/EP2020/060283, Jul. 1, 2020, pp. 1-8.
Claims pending in U.S. Appl. No. 17/414,966, national stage of PCT/EP2019/086136, Jun. 17, 2021, pp. 1-4.
Claims pending in U.S. Appl. No. 18/378,471, filed Oct. 10, 2023, pp. 1-3.
Claims pending in U.S. Appl. No. 18/818,761, filed Aug. 29, 2024, pp. 1-3.
Kota, B. P. et al. "An overview on biological mechanisms of PPARs" *Pharmacological Research*, 2005, pp. 85-94, vol. 51.

* cited by examiner

*Primary Examiner* — Christina Bradley
(74) *Attorney, Agent, or Firm* — SALIWANCHIK, LLOYD & EISENSCHENK

(57) ABSTRACT

The present invention relates to a combination therapy comprising a PPAR agonist, such as elafibranor, and a GLP-1 receptor agonist, such as semaglutide, liraglutide, exenatide, lixisenatide, albiglutide and dulaglutide, for the treatment of a condition is selected from the group consisting of non-alcoholic fatty liver disease, diabetes and obesity.

15 Claims, 18 Drawing Sheets
Specification includes a Sequence Listing.

SEQUENCE LISTING

```
<160> NUMBER OF SEQ ID NOS: 4

<210> SEQ ID NO 1
<211> LENGTH: 20
<212> TYPE: DNA
<213> ORGANISM: artificial
<220> FEATURE:
<223> OTHER INFORMATION: primer

<400> SEQUENCE: 1
aggcgaacaa ggtgacagag                                              20

<210> SEQ ID NO 2
<211> LENGTH: 19
<212> TYPE: DNA
<213> ORGANISM: artificial
<220> FEATURE:
<223> OTHER INFORMATION: primer

<400> SEQUENCE: 2
gccaggagaa ccagcagag                                               19

<210> SEQ ID NO 3
<211> LENGTH: 22
<212> TYPE: DNA
<213> ORGANISM: artificial
<220> FEATURE:
<223> OTHER INFORMATION: primer

<400> SEQUENCE: 3
tgactgtgga gcctatggac ca                                           22

<210> SEQ ID NO 4
<211> LENGTH: 22
<212> TYPE: DNA
<213> ORGANISM: artificial
<220> FEATURE:
<223> OTHER INFORMATION: primer

<400> SEQUENCE: 4
ctcaaaggag ccaggttgtg ca                                           22
```

COMBINATION THERAPY COMPRISING COMPOUNDS OF FORMULA (I) AND GLP-1 RECEPTOR AGONISTS

CROSS-REFERENCE TO RELATED APPLICATION

This application is the U.S. national stage application of International Patent Application No. PCT/EP2020/060283, filed Apr. 9, 2020.

REFERENCE TO SEQUENCE LISTING

The Sequence Listing for this application is labeled "Seq-List.txt" which was created on Sep. 10, 2021 and is 1 KB. The entire content of the sequence listing is incorporated herein by reference in its entirety.

The present invention relates to a combination therapy comprising a PPAR agonist and a GLP-1 receptor agonist.

Glucagon-like peptide-1 receptor agonists (or GLP-1R agonists) are a class of compounds proposed for the treatment of metabolic diseases such as obesity and type 2 diabetes. Several compounds of this class were approved as medicaments, such as semaglutide, liraglutide, exenatide, lixisenatide, albiglutide and dulaglutide. Despite their approval, this class of compounds could benefit from its combination to other classes of compounds to improve their therapeutic effect. In addition, GLP-1R agonists elicit adverse effects such as gastro-intestinal adverse effects. For example, common side effects of semaglutide and liraglutide include nausea, vomiting, diarrhea, abdominal pain and constipation. Methods for reducing these adverse effects would be advantageous.

The invention stems from the observation that combining a GLP-1R agonist with a PPAR agonist such as elafibranor results in several beneficial effects such as a synergy of action on steatosis, insulin levels and glycemia, body weight regulation and adverse effects reduction. In addition, it is herein shown that this combination opens the possibility of reducing the amount of GLP-1R agonists to be administered to a subject in need thereof, thereby further reducing the adverse effects associated with GLP-1R agonists.

Accordingly, the present invention relates to a combination product comprising:
(i) a PPAR agonist, in particular a compound of formula (I), or a pharmaceutically acceptable salt thereof:

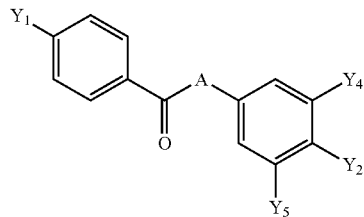

(I)

in which:
Y1 represents a halogen atom, a Ra, or Ga—Ra group;
A represents a CH=CH or a CH2-CH2 group;
Y2 represents a Gb-Rb group;
Ga and Gb, identical or different, represent an atom of oxygen or sulfur;
Ra represents a hydrogen atom, an unsubstituted (C1-C6) alkyl group, a (C6-C14)aryl group or a (C1-C6)alkyl group that is substituted by one or more halogen atoms, a (C1-C6)alkoxy or a (C1-C6)alkylthio group, (C3-C14)cycloalkyl groups, (C3-C14)cycloalkylthio groups or heterocyclic groups;
Rb represents a (C1-C6)alkyl group substituted by at least a —COORc group, wherein
Rc represents a hydrogen atom, or a (C1-C6)alkyl group that is substituted or not by one or more halogen atoms, (C3-C14)cycloalkyl groups, or heterocyclic groups; and
Y4 and Y5, identical or different, representing a (C1-C6) alkyl group that is substituted or not by one or more halogen atoms, (C3-C14)cycloalkyl groups or heterocyclic groups;
and
(ii) a Glucagon-like peptide-1 (GLP-1) receptor agonist.

In a particular embodiment of the invention, Y1 represents a Ga—Ra group.

In another particular embodiment, Ra represents a (C1-C6)alkyl group or a (C3-C14)cycloalkyl group. In yet another embodiment, Ra represents a (C1-C6)alkyl substituted or not by one or more halogen atoms, or Ra represents a (C3-C14)cycloalkyl group substituted or not by one or more halogen atoms.

In a further embodiment of the invention, Rb represents a (C1-C6)alkyl group substituted by a —COORc group, wherein Rc represents a hydrogen atom or an alkyl group having from one to four carbon atoms. In another embodiment, Rc represents a hydrogen atom.

In a particular embodiment of the compound of formula (I):
A represents a CH=CH group;
Ra represents a (C1-C6)alkyl or (C3-C14)cycloalkyl group, in particular a (C1-C6)alkyl or (C3-C14)cycloalkyl group substituted or not by one or more halogen atoms;
Rb represents a (C1-C6)alkyl group substituted by a —COORc group, wherein Rc represents a hydrogen atom or an alkyl group having from one to four carbon atoms; and
Y4 and Y5 independently represent a (C1-C4)alkyl group.

In a particular embodiment of the compound of formula (I):
A represents a CH2-CH2 group;
Ga represents an atom of oxygen or sulfur and Gb represents an atom of oxygen;
Ra represents a (C1-C6)alkyl or (C3-C14)cycloalkyl group;
Rb represents a (C1-C6)alkyl group substituted by at least a —COORc group, wherein Rc represents a hydrogen atom or (C1-C4)alkyl group; and
Y4 and Y5 independently represent a (C1-C4)alkyl group.

In a particular embodiment of the compound of formula (I):
A represents a CH2-CH2 group;
Ga represents an atom of oxygen or sulfur and Gb represents an atom of oxygen;
Ra represents a (C1-C6)alkyl or (C3-C14)cycloalkyl group that is substituted by one or more halogen atoms;
Rb represents a (C1-C6)alkyl group substituted or not by one or more halogen atoms and substituted by at least a —COORc group, wherein Rc represents a hydrogen atom or a (C1-C4)alkyl group; and
Y4 and Y5 represent a (C1-C4)alkyl group.

In a particular embodiment of the compound of formula (I), Gb is an oxygen atom and Rb is a (C1-C6)alkyl group substituted by a —COORc group, wherein Rc represents a hydrogen atom or an unsubstituted linear or branched (C1-C4)alkyl group. In a particular variant of this embodiment, Rc represents a hydrogen atom.

In a particular embodiment of the compound of formula (I), Y1 is a (C1-C6)alkylthio group that comprises a (C1-C6)alkyl group that is linear or branched that is substituted or not by one or more halogen atoms. In a variant of this embodiment, Y1 is a methylthio group.

In a particular embodiment, the compound of formula (I) is selected in the group consisting of 1-[4-methylthiophenyl]-3-[3,5-dimethyl-4-carboxydimethylmethyloxy phenyl]prop-2-en-1-one (elafibranor, ELA or GFT505), 1-[4-methylthiophenyl]-3-[3,5-dimethyl-4-isopropyloxycarbonyldimethylmethyloxyphenyl]prop-2-en-1-one, 1-[4-methylthiophenyl]-3-[3,5-dimethyl-4-tertbutyloxycarbonyldimethylmethyloxyphenyl]prop-2-en-1-one, 1-[4-trifluoromethylphenyl]-3-[3,5-di methyl-4-tertbutyloxycarbonyldimethylmethyloxyphenyl]prop-2-en-1-one, 1-[4-trifluoromethylphenyl]-3-[3,5-dimethyl-4-carboxydimethylmethyloxyphenyl]prop-2-en-1-one, 1-[4-trifluoromethyl oxyphenyl]-3-[3,5-di methyl-4-tertbutyloxycarbonyldimethylmethyloxyphenyl]prop-2-en-1-one, 1-[4-trifluoromethyloxyphenyl]-3-[3,5-dimethyl-4-carboxydimethylmethyloxyphenyl]prop-2-en-1-one, 2-[2,6-dimethyl-4-[3-[4-(methylthio)phenyl]-3-oxo-propyl]phenoxy]-2-methylpropanoic acid, 2-[2,6-dimethyl-4-[3-[4-(methylthio)phenyl]-3-oxo-propyl]phenoxy]-2-methyl-propanoic acid isopropyl ester, and pharmaceutically acceptable salts thereof.

In a particular embodiment of the invention, component (i) is elafibranor or a pharmaceutically acceptable salt thereof.

In the context of the present invention, the expression "Glucagon-like peptide-1 (GLP-1) receptor agonists" refers to GLP-1 analogs and GLP-1 receptor agonists that are not GLP-1 analogs. GLP-1 receptor agonists (also noted GLP-1R agonists) are compounds that bind to and activate the GLP-1 receptor. Illustrative GLP-1 receptor agonists include, but are not limited to semaglutide, liraglutide, exenatide, albiglutide, dulaglutide, lixisenatide, loxenatide, efpeglenatide, taspoglutide, MKC-253, DLP-205, ORMD-0901, LY-3305677, oxyntomodulin long acting, and pharmaceutically acceptable salts thereof.

In a particular embodiment, component (ii) is semaglutide, liraglutide, exenatide, lixisenatide, albiglutide, dulaglutide, or a pharmaceutically acceptable salt of one of these compounds.

In a particular embodiment, component (ii) is semaglutide or a pharmaceutically acceptable salt thereof.

In another particular embodiment, component (ii) is liraglutide or a pharmaceutically acceptable salt thereof.

According to the invention components (i) and (ii) can be selected so that the combination of said compounds provides a synergistic action. Such synergy may be determined according to methods well-known in the art, such as by using the Excess Over Bliss (EOB, or Excess over Highest Single Agent) method. This method, employed by the FDA for approval of combination drug products, assumes that the expected combination effect is superior to the effect obtained with the best component of the combination when taken individually. As demonstrated in the examples, the combination of elafibranor and a GLP-1R agonist such as semaglutide or liraglutide produces a synergistic action on steatosis (liver fat), triglyceride levels, weight loss, insulin levels and glycemia.

Accordingly, in a particular embodiment, component (i) is elafibranor or a pharmaceutically acceptable salt thereof, and component (ii) is semaglutide or a pharmaceutically acceptable salt thereof.

In another particular embodiment, component (i) is elafibranor or a pharmaceutically acceptable salt thereof, and component (ii) is liraglutide or a pharmaceutically acceptable salt thereof.

In a particular embodiment, the combination product of the invention is a pharmaceutical composition comprising both components (i) and (ii), in a pharmaceutically acceptable carrier.

In another embodiment, the combination product of the invention is a kit of parts comprising component (i) and component (ii), for sequential, separate or simultaneous use. In this embodiment, each of the components can be formulated in different pharmaceutical compositions.

The pharmaceutical compositions used in the invention can comprise one or several excipients or vehicles, acceptable within a pharmaceutical context (e.g. saline solutions, physiological solutions, isotonic solutions, etc., compatible with pharmaceutical usage and well-known by one of ordinary skill in the art). These compositions can also comprise one or several agents or vehicles chosen among dispersants, solubilisers, stabilisers, preservatives, etc. Agents or vehicles useful for these formulations (liquid and/or injectable and/or solid) are particularly methylcellulose, hydroxymethylcellulose, carboxymethylcellulose, polysorbate 80, mannitol, gelatin, lactose, vegetable oils, acacia, liposomes, etc. The compounds used in the present invention can be formulated for enteral or parenteral administration. For example, the compounds can be formulated for oral, intravascular (e.g. intravenous or intra-arterial), intramuscular, intraperitoneal, subcutaneous, transdermal or nasal administration. The formulation can be a solid or liquid dosage form. Illustrative formulations include, without limitation, an injectable suspension, or suspension for oral ingestion, a gel, an oil, a pill, a tablet, a suppository, a powder, a capsule, an aerosol, an ointment, a cream, a patch, or means of galenic forms for a prolonged and/or slow release. For this kind of formulation, agents such as cellulose, carbonates or starches can be advantageously used.

The compounds implemented herein can be formulated as pharmaceutically acceptable salts, particularly acid or base salts compatible with pharmaceutical use. Salts of the compounds implemented herein include pharmaceutically acceptable acid addition salts, pharmaceutically acceptable base addition salts, pharmaceutically acceptable metal salts, ammonium salts and alkylated ammonium salts. These salts can be obtained during the final purification step of the compound or by incorporating the salt into the previously purified compound.

As provided above, the active ingredients (i.e. component (i) and component (ii) of the combination product) can be for administration as one or more pharmaceutical composition (s), such as in the form of a pill or tablet intended for an oral ingestion.

In another embodiment, the active ingredients are for administration as one or more pharmaceutical composition (s), such as in the form of injectable solutions.

In a further particular embodiment, the active ingredients are for administration as separate compositions.

In another embodiment, component (i) is in the form of an oral composition and component (ii) is in the form of an oral composition.

In a particular embodiment of the invention:
component (i) is a solid composition form of elafibranor or a pharmaceutically acceptable salt thereof, for oral administration, in particular in the form of a pill or tablet, more particularly a tablet; and
component (ii) is a solid dosage form of a GLP-1R agonist or a pharmaceutically acceptable salt thereof, for oral administration, in particular in the form of a pill or tablet, more particularly a tablet.

In a particular embodiment of the invention, component (ii) is a solid dosage form for oral administration a comprising GLP-1R agonist and a salt of N-(8-(2-hydroxybenzoyl)amino)caprylic acid, as described in application WO2012080471, In another embodiment, component (ii) is a solid dosage form for oral administration comprising a GLP-1 R agonist and sodium N-(8-(2-hydroxybenzoyl)amino)caprylic acid (otherwise referred to as SNAC or salcaprozate sodium). In yet another embodiment, component (ii) is a solid dosage form for oral administration comprising semaglutide and a salt of N-(8-(2-hydroxybenzoyl)amino)caprylic acid, such as SNAC. In a particular embodiment, component (ii) is in the form of a tablet.

In a further embodiment, component (i) is in the form of an oral composition and component (ii) is in the form of an injectable solution.

In yet another embodiment, component (i) is in the form of an injectable solution and component (ii) is in the form of an oral composition.

In a further embodiment, component (i) is in the form of an injectable solution and component (ii) is in the form of an injectable solution.

The frequency and/or dose relative to the administration can be adapted by one of ordinary skill in the art, in function of the subject to be treated, the disease to be treated, the stage of the disease, the form of administration, etc. Typically, component (i), such as ELA or a pharmaceutically acceptable salt thereof can be administered at a dose comprised between 0.01 mg/day to 4000 mg/day for elafibranor, such as from 1 mg/day to 2000 mg/day, in particular from 25 to 1000 mg/day, particularly from 50 to 200 mg/day, and even more particularly from 80 to 120 mg/day for elafibranor. In another particular embodiment, component (ii), such as semaglutide or luraglutide, in particular semaglutide, or a pharmaceutically acceptable salt thereof, can be administered at a dose comprised between 0.001 mg/day and 200 mg/day, such as from 0.01 mg/day to 150 mg/day, in particular from 0.1 mg/day to 100 mg/day.

In yet another particular embodiment, dosage of the components of the combination product of the invention is as follows:
component (i) is a solid dosage form of elafibranor for oral administration at a dose comprised between 0.01 mg/day to 4000 mg/day, such as from 1 mg/day to 2000 mg/day, in particular from 25 to 1000 mg/day, particularly from 50 to 200 mg/day, and even more particularly from 80 to 120 mg/day; and
component (ii) is a solid dosage form of semaglutide for oral administration at a dose of 1 to 20 mg/day, such as at a dose of 3 to 14 mg/day.

In another embodiment of the invention, dosage of the components of the combination product of the invention is as follows:
component (i) is a solid dosage form of elafibranor for oral administration at a dose comprised between 80 to 120 mg/day; and
component (ii) is a solid dosage form of semaglutide for oral administration at a dose at a dose comprised between 3 and 14 mg/day.

In yet another particular embodiment of the invention, dosage of the components of the combination product of the invention is as follows:
component (i) is a solid dosage form of elafibranor for oral administration at a dose comprised between 80 to 120 mg/day; and
component (ii) is a solid dosage form of semaglutide for oral administration at a dose at a dose of 3 mg/day, 7 mg/day or 14 mg/day.

In a further embodiment, dosage of the components of the combination product of the invention is as follows:
component (i) is a solid dosage form of elafibranor for oral administration at a dose comprised between 80 to 120 mg/day; and
component (ii) is a solid dosage form of semaglutide for oral administration at a dose at a dose of 3 mg/day, 7 mg/day or 14 mg/day.

In a further embodiment, dosage of the components of the combination product of the invention is as follows:
a tablet comprising 80 to 120 mg of elafibranor is administered once daily; and
a tablet comprising 3 mg, 7 mg or 14 mg of semaglutide is administered once daily.

In a further embodiment, dosage of the components of the combination product of the invention is as follows:
a tablet comprising 80 mg of elafibranor is administered once daily; and
a tablet comprising 3 mg, 7 mg or 14 mg of semaglutide is administered once daily.

In another particular embodiment, dosage of the components of the combination product of the invention is as follows:
a tablet comprising 120 mg of elafibranor is administered once daily; and
a tablet comprising 3 mg, 7 mg or 14 mg of semaglutide is administered once daily.

Dosage of oral semaglutide can be adapted by one skilled in the art. An oral dosage form of semaglutide was recently approved by the US Food and Drug administration and by the European Medicine Agency, under the trademark Rybelsus®. The skilled person can thus determine the dose of semaglutide to administer on the basis of recommended dosage disclosed in the prescribing information provided with this medicament, as indicated for the improvement of glycemic control in adults with type 2 diabetes mellitus. Briefly:
administration of oral semaglutide can start with 3 mg once daily for 30 days;
after 30 days on the 3 mg dose, the dose is increased to 7 mg once daily; and
the dose may be increased to 14 mg once daily if additional effect, such as additional glycemic control in the context of an administration for the improvement of glycemic control, is needed after at least 30 days on the 7 mg dose.

In another aspect, the invention relates to the combination of the invention, for use as a medicament.

The combination of the invention can be used in a method for reducing body weight. For example, the invention relates to a combination of the invention for use in a method for the treatment of obesity.

The combination of the invention can also be used to decrease liver fat (otherwise termed "steatosis"). Accordingly, the invention relates to a combination of the invention for use in a method for the treatment of a non-alcoholic fatty liver disease (NAFLD). In a further particular embodiment, the NAFLD is fibrosing NAFLD, i.e. the subject has NAFLD with liver fibrosis. In another particular embodiment, the NAFLD is NASH. The NASH may also be fibrosing NASH, i.e. the subject has NASH with liver fibrosis.

The combination of the invention can also be used to reduce glycemia. Accordingly, the invention also relates to the combination of the invention for use in a method for reducing glycemia. The combination of the invention can also be used to control insulin levels. Therefore, the invention also relates to the combination of the invention for use in a method for controlling insulin levels.

In a particular embodiment, the combination of the invention is for use in a method for the treatment of diabetes, in particular type 2 diabetes.

In a further embodiment, the combination of the invention is for use in a method for improving glycemic control in a subject with type 2 diabetes.

It is also herein shown that food intake is not impacted by the administration of the combination of the invention. A decrease in food intake is an indicator of adverse effects of GLP-1R agonists. Accordingly, it is herein shown that the combination of the invention can advantageously be used to reduce or suppress the adverse effects of a GLP-1R agonist.

In a particular embodiment, the combination of the invention is for use in a method for reducing body weight or body fat mass, with reduced or suppressed adverse effects. In the context of the present invention, the expression "with reduced or suppressed adverse effects" denotes a reduction or suppression of at least one or all adverse effects generally associated to the intake of a GLP-1R agonist alone, such as gastro-intestinal adverse effects, for example nausea, vomiting, diarrhea, abdominal pain and/or constipation.

In another embodiment, the combination of the invention is for use in a method for the treatment of obesity, with reduced or suppressed adverse effects.

In a further particular embodiment, the combination of the invention is for use in a method for the treatment of a NAFLD, with reduced or suppressed adverse effects. In specific variant, the combination is used for the treatment of fibrosing NAFLD, of NASH, or of fibrosing NASH.

In yet another embodiment, the combination of the invention is for use in a method for reducing glycemia, with reduced or suppressed adverse effects.

In another embodiment, the combination of the invention is for use in a method for reducing insulin levels, with reduced or suppressed adverse effects.

In a further embodiment, the combination of the invention is for use in a method for the treatment of diabetes, with reduced or suppressed adverse effects. More particularly, the invention relates to the combination of the invention, for use in a method for the treatment of type 2 diabetes, with reduced or suppressed adverse effects.

It is also herein shown that the combination of the invention advantageously allows regulation of body weight. Accordingly, the invention also relates to the combination of the invention for use in a method for regulating body weight.

In a particular embodiment, the combination of the invention is for use in a method for regulating body weight in the context of a method for the treatment of obesity.

In a further particular embodiment, the combination of the invention is for use in a method for regulating body weight in the context of a method for reducing liver fat, such as in the context of a method for the treatment of a NAFLD. In specific variant, the combination is used for regulating body weight in the context of a method for the treatment of fibrosing NAFLD, of NASH, or of fibrosing NASH.

In yet another embodiment, the combination of the invention is for use in a method for regulating body weight in the context of a method for reducing glycemia.

In another embodiment, the combination of the invention is for use in a method for regulating body weight in the context of a method for reducing insulin levels.

In a further embodiment, the combination of the invention is for use in a method for regulating body weight in the context of a method for the treatment of diabetes, such as type 2 diabetes.

Surprisingly, in addition to the synergistic effect the combination of the invention provides, it is also herein shown that said combination of components (i) and (ii) of the combination product leads to beneficial effects observed at reduced doses of component (ii). Said otherwise, component (i) can be used to reduce the amount of component (ii) while still benefiting from the desired effects of both component (i) and component (ii). A reduction or suppression of the adverse effects generally observed with a GLP-1R agonist can thus be obtained without impacting, or without significantly impacting the desired therapeutic effect. Accordingly, the invention also relates to a PPAR agonist, such as a compound of formula (I), for use in combination with a GLP-1 receptor agonist in a method for the treatment of a condition for which the administration of a GLP-1 receptor agonist is needed, thereby reducing the side effects of the GLP-1 receptor agonist. In this aspect, the GLP-1 receptor agonist can be administered at a reduced amount as compared to the amount administered when the GLP-1 receptor agonist is administered alone. For example, the reduction of the amount of GLP-1 receptor agonist administered to the subject may be of at least 1.5-fold, at least 2-fold, at least 2.5-fold, at least 3-fold, at least 3.5-fold, at least 4-fold, at least 4.5-fold, at least 5-fold, at least 5.5-fold, at least 6-fold, at least 6.5-fold, at least 7-fold, at least 7.5-fold, at least 8-fold, at least 8.5-fold, at least 9-fold, at least 9.5-fold, or even at least 10-fold.

The invention thus also further relates to a combination of the invention, for use in a method for the treatment of a condition for which the administration of a GLP-1 receptor agonist is needed, thereby reducing the side effects associated to the GLP-1 receptor agonist. Illustrative side effects decreased thanks to the invention can be at least one, or all, of the following side effects: nausea, vomiting, diarrhea, abdominal pain and constipation.

The invention also relates to a combination of the invention, for use in a method for the treatment of a condition for which the administration of a GLP-1 receptor agonist is needed, wherein the amount of GLP-1 receptor agonist administered to the subject is reduced as compared to the amount of GLP-1 receptor agonist required when administered alone. For example, the reduction of the amount of GLP-1 receptor agonist administered to the subject may be of at least 1.5-fold, at least 2-fold, at least 2.5-fold, at least 3-fold, at least 3.5-fold, at least 4-fold, at least 4.5-fold, at least 5-fold, at least 5.5-fold, at least 6-fold, at least 6.5-fold, at least 7-fold, at least 7.5-fold, at least 8-fold, at least 8.5-fold, at least 9-fold, at least 9.5-fold, or even at least 10-fold.

In yet another embodiment, the invention relates to the combination product as disclosed herein, for use in a method for the treatment of a condition for which the administration of a GLP-1 receptor agonist is needed, wherein component (i) is administered to potentialize the activity of component (ii). Such potentialization can advantageously result in a dosage of the GLP-1 receptor agonist reduced as compared to the amount of GLP-1 agonist required when administered alone. For example, the reduction of the amount of GLP-1 receptor agonist administered to the subject may be of at least 1.5-fold, at least 2-fold, at least 2.5-fold, at least 3-fold, at least 3.5-fold, at least 4-fold, at least 4.5-fold, at least 5-fold, at least 5.5-fold, at least 6-fold, at least 6.5-fold, at least 7-fold, at least 7.5-fold, at least 8-fold, at least 8.5-fold, at least 9-fold, at least 9.5-fold, or even at least 10-fold.

Of course, all GLP-1 receptor agonist dose reduction mentioned above can also be expressed as a percentage relative to the dose normally used when the GLP-1 receptor agonist is used alone. For example, thanks to the invention, the reduction can be of at least 10%, 15%, 20%, 25%, 30%, 35%, 40%, 45%, 50% or even more than 50% of the dose normally used when the GLP-1 receptor agonist is used alone.

An illustrative implementation of the above-mentioned reduced amounts of GLP-1 receptor agonists can be, for example, the reduction of the dose of semaglutide administered orally according to the regimen disclosed in Rybelsus® prescribing information as disclosed above. An illustration of a non-limiting administration regimen, in particular for the treatment of NASH (such as NASH with fibrosis) or in the improvement of glycemic control in a subject with type 2 diabetes, is provided below, with a 50% reduction in the dose of the GLP-1 receptor agonist:

administration of oral semaglutide can start with 1.5 mg once daily for 30 days;

after 30 days on the 3 mg dose, the dose is increased to 3.5 mg once daily; and the dose may be increased to 7 mg once daily if additional effect, such as additional glycemic control in the context of an administration for the improvement of glycemic control, is needed after at least 30 days on the 3.5 mg dose.

In the context of the present invention, the expression "condition for which a GLP-1 receptor agonist is indicated" includes, without limitation, conditions or diseases the treatment of which would benefit from the administration of a GLP-1 receptor agonist. These include, without limitation, diabetes, such as type 2 diabetes, obesity, NAFLD and NASH.

In the context of the present invention, the abbreviation ELA refers to elafibranor.

In the context of the present invention, the abbreviation SEMA refers to semaglutide.

In the context of the present invention, the abbreviation LIRA refers to liraglutide. The term "treatment" or "treating" refers to the curative or preventive treatment of a disease in a subject in need thereof. The treatment involves the administration of the combination of the invention to a subject having a declared disease, to prevent, cure, delay, reverse, or slow down the progression of the disease, improving thereby the condition of the subject. The combination product can also be administered to a subject that is healthy or at risk of developing a disease. The subject to be treated is a mammal, preferably a human. The subject to be treated according to the invention can be selected on the basis of several criteria associated to the specific disease the treatment of which is sought such as previous drug treatments, associated pathologies, genotype, exposure to risk factors, viral infection, as well as on the basis of the detection of any biomarker relevant to the disease.

Administration can be performed daily or even several times per day, if necessary. The duration of the treatment will depend on the specific disease to be treatment. For example, the administration can be performed during one or several days, such as during at least one day, at least two days, at least three days, at least four days, at least five days, at six two days or at least seven days. Alternatively, the administration can be performed for at least one week, at least two weeks, at least four weeks. For chronic diseases, administration can be considered for more than four weeks, such as for at least one month, two months, three months, four months, five months, six months or more than six months, such as for at least one year or several years. In some cases, the combination product of the invention can be administered during the lifetime of the subject.

The invention is further described with reference to the following, non-limiting, examples.

DESCRIPTION OF THE FIGURES

FIG. 10A shows the algorithm used for RNAseq analysis to identify the pathological signature, effects of compounds and modulated pathways in the transcriptomic analysis of the livers after 12 weeks of treatment with ELA (10 mg/kg/day), SEMA (0.3 nmol/kg/day) and their combination in DIO-NASH mice.

(FIG. 11A, FIG. 11B) Percentage inhibition of TNFα secretion of the dose-response matrix, (FIG. 11C, FIG. 11D) analysis according to the Excess Over Bliss (EOB) additivism model, and (FIG. 11E, FIG. 11F) TNFα secretion plotted in a bar graph for representative synergistic combinations between elafibranor and semaglutide (FIG. 11A, FIG. 11C, FIG. 11E) in one hand, and elafibranor and liraglutide (FIG. 11B, FIG. 11D, FIG. 11F) on the other. Data are presented as mean (quadruplicates)±standard deviation (SD).

EXAMPLES

Compounds

Elafibranor was synthesized at Genfit. Semaglutide and liraglutide were commercially available.

Elafibranor was dissolved in 1% CMC+0.1% Tween 80.

Semaglutide was dissolved in 1% CMC+50 mM Na2HPO4+70 mM NaCl+0.05% Tween 80.

Liraglutide was dissolved in BSA 0.1% in phosphate buffer saline (PBS 1×).

Statistical Analysis

For statistical methods, Shapiro-Wilk normality test was applied for all the raw data.

In case of normal distribution, comparison of chow vs vehicle (Veh) is done in a one-tailed student t-test (#). A welch (□) correction can be applied if necessary.

For multiple comparison test, one-way ANOVA and Fisher's Least Significant Difference (LSD) post-hoc test (*) was applied.

In other cases, comparison of chow vs vehicle (Veh) is done in a One-tailed Mann-Whitney ($) and a Kruskall Wallis uncorrected Dunn's post-hoc test (§) was applied for multiple comparison test.

Fisher's exact test was used to compare distribution (£).

Therapeutic synergy of drug combination was evaluated using the excess over the highest single agent (HAS) model (one-tailed statistical test).

/□/*/$/§ /£/°: p<0.05

/□□/**/$$/§§ /££/°°: p<0.01

/□□□/***/$$$/§ § /£££/°°°: p<0.001

Example 1: Effect of 40 Days of Treatment with Elafibranor Alone or in Combination with Semaglutide on Food Intake and Body Weight Regulation in Male DIO-NASH Mice Animal Model The effects of elafibranor alone, semaglutide alone and the combination of both were assessed in DIO-NASH mice (C57BL6JRj mice fed with a Amylin Liver NASH Model diet (AMLN) (Research Diet, 40% fat (18% trans-fat), 40% carbohydrate (20% fructose), and 2% cholesterol) (36 weeks prior to study start). 41 weeks old male DIO-NASH mice were fed a vehicule (n=12), or vehicule supplemented with elafibranor (10 mg/kg/day), or semaglutide alone (10 nmol/ kg) (titration to final dose over 5 days using increments of 0.08 mg/mL) or in combination (n=12 per group).

The body weight was monitored once a day. The food and water intake were monitored once a day during weeks 1-2 then once a week during the following weeks.

Sampling from tail vein were done during the protocol for, blood glucose, plasma insulin, alanine transaminase, aspartate transaminase, triglycerides, total cholesterol dosages.

On the last day of treatment, plasma samples were obtained after cardiac puncture blood sampling and mice were sacrificed. The liver was rapidly excised for biochemical and histological analyses.

All animal procedures were performed according to standard protocols and in accordance with the standard recommendations for the proper care and use of laboratory animals.

Body Weight and Food Intake

The body weight was monitored once a day. The food and water intake were monitored once a day during weeks 1-2 then one a week during the following weeks.

Figure 1:
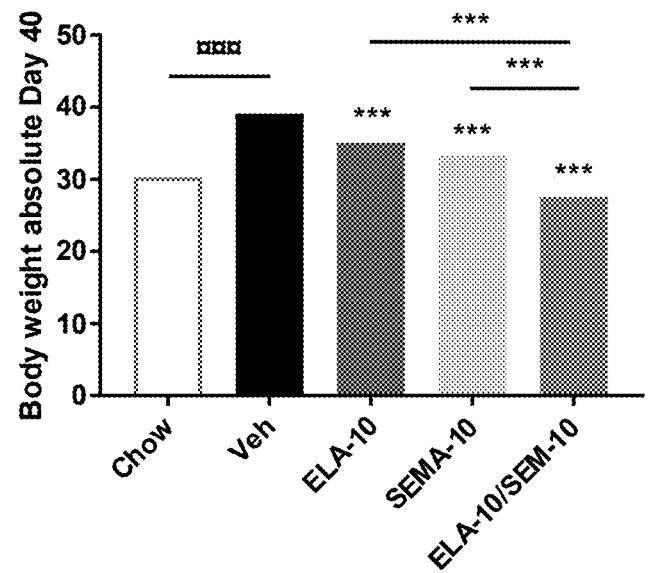
FIG. 1: Effect of the combination of 10 mg/kg/day of elafibranor (ELA) and 10 nmol/kg/day of semaglutide (SEMA) on the body weight after 40 days of treatment.
Figure 2:
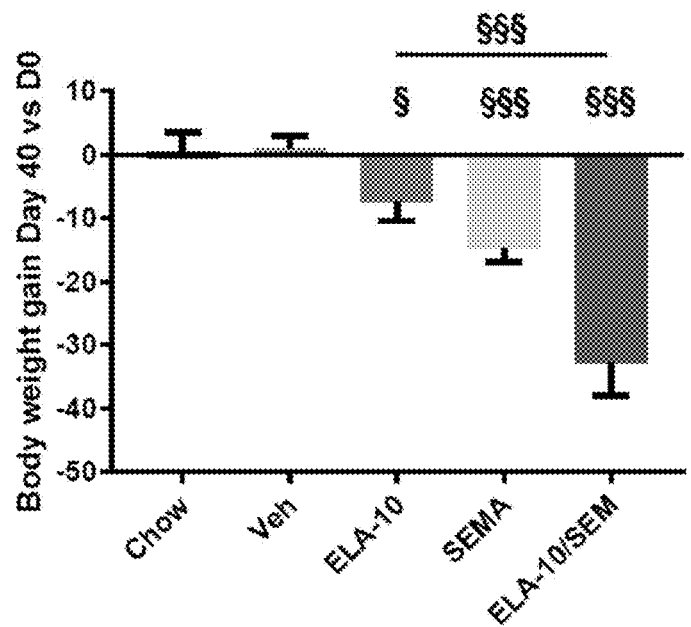
FIG. 2: Effect of the combination of 10 mg/kg/day of ELA and 10 nmol/kg/day of semaglutide on weight after 40 days of treatment, expressed as the relative weight gain vs day 0.

Terminal absolute body weight at day 40 is shown in FIG. 1. Relative weight at day 40 as compared to day 0 is also shown in FIG. 2. Body weight significatively decreased with the combination of elafibranor and semaglutide.

Biochemical Analyses

Measurement of Hepatic Triglyceride Content

Approximately 100 mg of frozen liver tissue were homogenized with a tissue homogenizer (Precellys®24, Bertin Technologies, France) in 150 mM NaCl buffer, containing 15.4 mM NaN3. Lipid fractions in homogenates were extracted with chloroform—methanol (2:1, v/v) followed by measurement of the triglycerides (Biolabo cat #80019).

Figure 3:
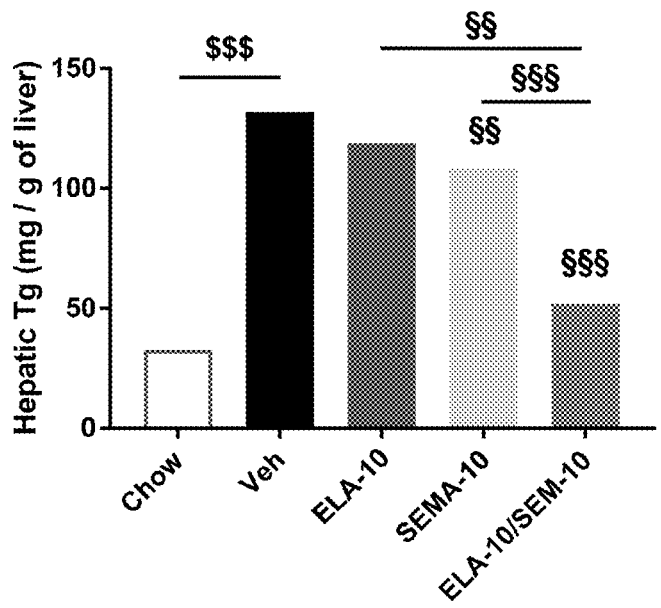
FIG. 3: Effect of the combination of 10 mg/kg/day of ELA and 10 nmol/kg/day of semaglutide on hepatic triglyceride content after 40 days of treatment.

Treatment with semaglutide (10 nmol/kg/day) had a significant beneficial effect on liver fat in this model (FIG. 3). The combination of semaglutide with elafibranor led to a significative effect on liver triglyceride content.

Measurement of Glycemia

The plasma glucose level was measured using the Randox kit for Daytona automate (Randox, cat #GL 3815) according to the manufacturer's recommendations. This method was based on a colorimetric assay without any deproteinization of the sample. Briefly, glucose oxidase digestion of the sample led to hydrogen peroxide synthesis. In the presence of phenol and 4-aminophenazone, the hydrogen peroxide was catalyzed by a peroxidase and formed a dye: the quinoneimin. The coloration intensity was directly proportional to the glucose concentration and was measured at 505 nm. Results were expressed in mg/dL.

Figure 4:
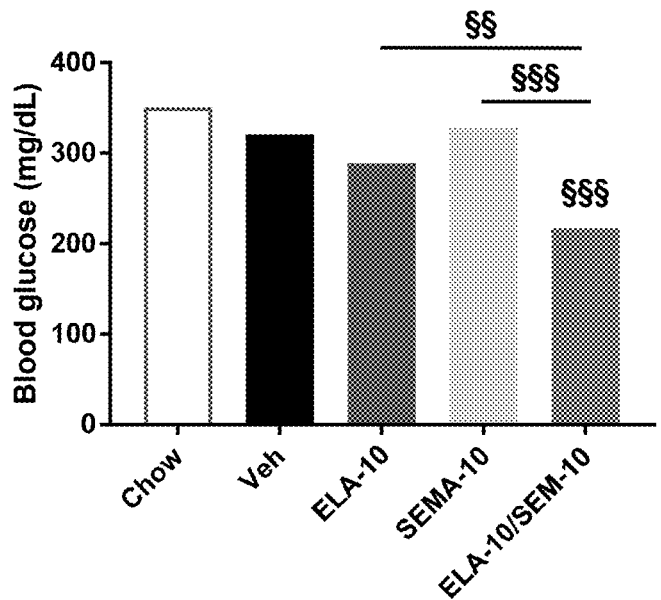
FIG. 4: Effect of the combination of 10 mg/kg/day of ELA and 10 nmol/kg/day of semaglutide on glycemia after 40 days of treatment.

Treatment with elafibranor (10 mg/kg/day) alone and semaglutide (10 nmol/kg/day) alone had no beneficial effect on glycemia in this model (FIG. 4). The combination of semaglutide with elafibranor led to a significant effect on glycemia (FIG. 4).

Measurement of Insulinemia

The plasmatic insulin was measured using a solid phase two-site enzyme immunoassay from Crystal Chem Inc. (cat #90010). Briefly, 95 µL of guinea-pig anti-insulin serum and 5 µL of diluted sample (or standard) were dispensed per well into a 96-well plate. After an overnight incubation at 4° C. and washing, 100 µL of anti-guinea pig antibody conjugated to peroxidase were added and the reaction was accrued by additional incubation at room temperature for 1 hour. Thereafter, 100 µL of the enzyme substrate were dispensed, followed by a further incubation period of 30 minutes at room temperature in the dark. The reaction was then stopped by adding 100 µL of stop solution and absorbance was immediately measured at 450 nm (subtracting wave length: 630 nm). The intensity of the coloration was proportional to the amount of insulin initially present in the sample and was calculated using a standard serum. Results were expressed in ng/mL.

Figure 5:
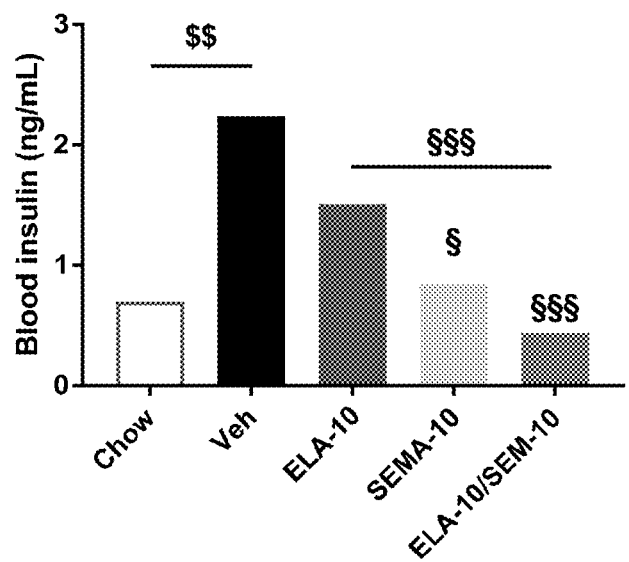
FIG. 5: Effect of the combination of 10 mg/kg/day of ELA and 10 nmol/kg/day of semaglutide on insulinemia after 40 days of treatment.

Treatment with semaglutide (10 nmol/kg/day) had a significant beneficial effect on insulinemia in this model (FIG. 5). The combination of semaglutide with elafibranor led to a significant effect on insulinemia (FIG. 5).

Histology

Tissue Embedding and Sectioning:

The liver slices were first fixed for 12 hours in formalin 4% solution. Then, the liver pieces were washed 30 minutes in PBS, and dehydrated in ethanol solutions (successive baths at 70, 80, 95 and 100% ethanol). The liver pieces were incubated in three different baths of Xylene (Sigma-Aldrich cat #534056), followed by two baths in liquid paraffin (56° C.). Liver pieces were then put into racks that were gently filled with Histowax® to completely cover the tissue. The paraffin blocks containing the tissue pieces were removed from the racks and stored at room temperature. The liver blocks were cut into 3 µm slices.

Hematoxylin/Eosin/Safranin Staining

Liver sections were deparaffinized, rehydrated and incubated for 3 minutes in Mayer's Hematoxylin (Microm, cat #F/C0303). Then, the liver sections were rinsed in water and incubated 1 minute in a Eosin Y 0.5% alcoholic (VWR, cat #1.02439.0500) and Erythrosin 0.5% solution (VWR, cat #1.15936.0010), and rinsed in with ethanol. Sections were then incubated for 2 minutes in Safranin, and were eventually dehydrated and mounted using the CV Mount medium (Leica, cat #046430011).

Histological Examinations

A technician blinded to the source of each liver specimen performed histological examinations. Virtual slides were generated using the Pannoramic 250 scanner from 3D Histech. For each animal, a score summarizing the main histological lesions of NASH was attributed according to the NASH Clinical Research Network (Kleiner 2005, Brunt 1999). Steatosis was scored (0-3).

NASH was induced in DIO-NASH mice. Animals in the intervention groups, received either elafibranor or semaglutide or both compounds for the entire study period. NASH development was evaluated by histology. Additional biochemical and molecular analyses were also performed on different relevant biomarkers.

DIO-NASH mice developed NASH-related histology with high penetration of severe disease. Advanced steatosis was present in all animals.

Figure 6:
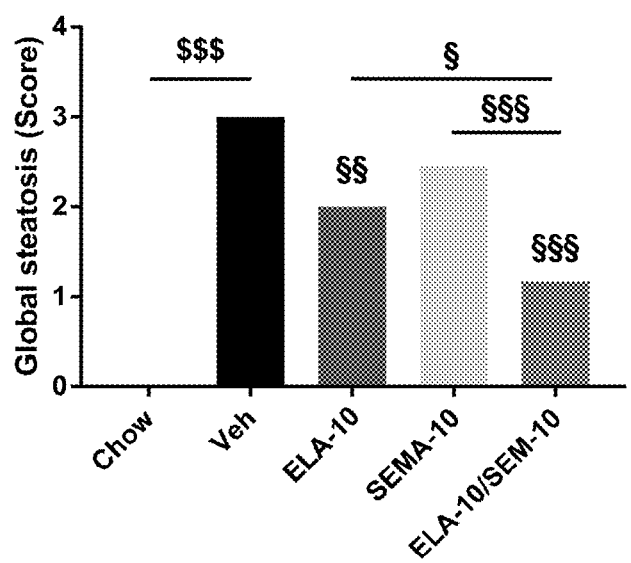
FIG. 6: Effect of the combination of 10 mg/kg/day of ELA and 10 nmol/kg/day of semaglutide on steatosis after 40 days of treatment.

The combination of semaglutide with elafibranor led to a significant steatosis decrease (FIG. 6).

Example 2: Effect of 4 Weeks of Treatment with Elafibranor Alone and in Combination with Semaglutide on Food Intake and Body Weight Regulation in Male DIO-NASH Mice Animal Model The effects of elafibranor alone, semaglutide alone and the combination of both were assessed in DIO-NASH mice. 42-44 weeks old male DIO-NASH mice were fed a vehicle (n=6), or vehicle supplemented with elafibranor (10 mg/kg/day), or semaglutide alone or in combination (n=6 per group) for 4 weeks. Combinations were evaluated with 2 doses of semaglutide:
  semaglutide 0.3 nmol/kg
  semaglutide 1 nmol/kg, The body weight, the food and water intake were monitored once a day.

On the last day of treatment, plasma samples were obtained from retro-orbital blood sampling and mice were sacrificed after a 6 h-fasting period. The liver was rapidly excised for biochemical and histological analyses.

All animal procedures were performed according to standard protocols and in accordance with the standard recommendations for the proper care and use of laboratory animals.

Body Weight and Food Intake

The body weight was monitored once a day. The food and water intake were monitored once a day during 28 days.

Figure 7A:
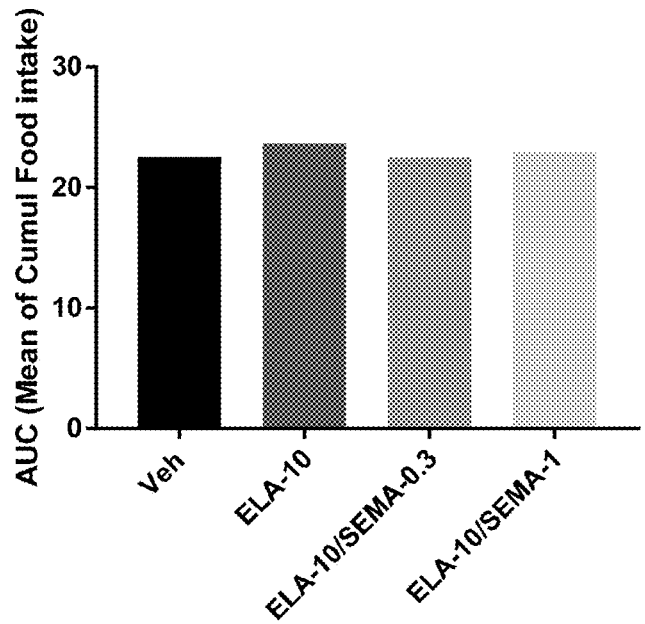
FIG. 7A: Effect of the combination of 10 mg/kg/day of ELA and 0.3 or 1 nmol/kg/day of semaglutide on food intake after 28 days of treatment.

Mean of cumul food intake is shown in FIG. 7A. Stable food intake was noticed for the period for all treated groups, notably for the combination of elafibranor with semaglutide at dose of 0.3 or 1 nmol/kg. This effect demonstrates that the combination of elafibranor with semaglutide reduces the adverse effects of semaglutide.

Figure 7B:
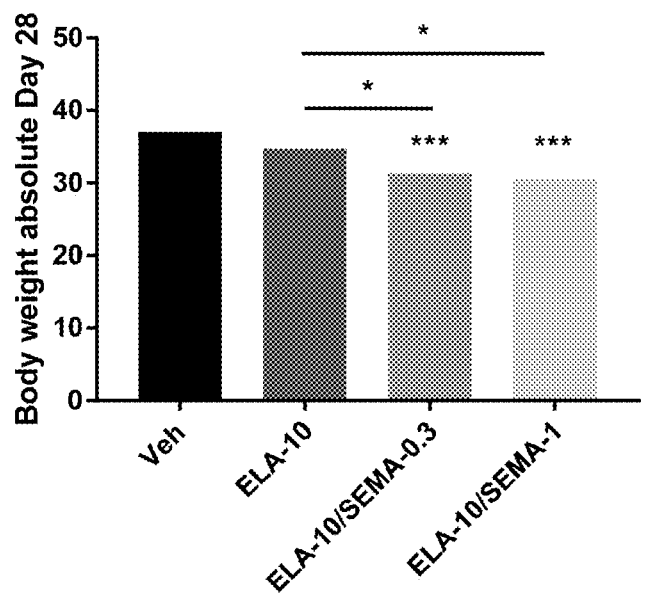
FIG. 7B: Effect of the combination of 10 mg/kg/day of ELA and 0.3 or 1 nmol/kg/day of semaglutide on the body weight after 28 days of treatment.

Terminal absolute body weight at the end of the 28 day period is shown in FIG. 7B. Body weight significatively decreased with the combination of elafibranor and semaglutide at the two doses tested.

We found significant effects of the combination of elafibranor and semaglutide on body weight loss with a dose of semaglutide 3 to 10 fold lower. Moreover the combination of elafibranor and semaglutide presents a therapeutic interest for a number of diseases, including NASH, and reduces adverse effect of semaglutide.

Example 3: Effect of 12 Weeks of Treatment with Elafibranor Alone and in Combination with Semaglutide on NASH in Male DIO-NASH Mice Animal Model Male C57BL/6JRj mice were fed with the AMLN diet 35 weeks prior to study start (DIO-NASH model). Mice with biopsy confirmed steatosis (score ≥2) and fibrosis (score ≥1) were randomized into treatment groups (n=12-14 per group). Mice received either vehicles, elafibranor (10 mg/kg/day, per os), semaglutide (0.3 nmol/kg/day, SC) or both elafibranor and semaglutide for 12 weeks. Suboptimal drug doses were used in this study. To avoid SEMA-induced hypophagia, an up-titration protocol was applied during the first 3 weeks of treatment.

On the last day of treatment, plasma samples were obtained after cardiac puncture blood sampling and mice were sacrificed. The liver was rapidly excised for histology and biochemical and transcriptomic analyses.

All animal procedures were performed according to standard protocols and in accordance with the standard recommendations for the proper care and use of laboratory animals.

Histological Assessment of NASH

Liver sections were prepared and stained with hematoxylin eosin safranin (HES) as described in Example 1. The histological features of NASH (steatosis, ballooning, lobular inflammation and fibrosis) were assessed using the NASH Clinical Research Network Scoring System by operators blinded to the experimental groups (Kleiner 2005, Brunt 1999). Steatosis score, activity index (hepatocyte ballooning+lobular inflammation) and NAFLD activity score (NAS) were calculated. Number of inflammatory foci was counted per field using a 200× magnification.

Figure 8A:
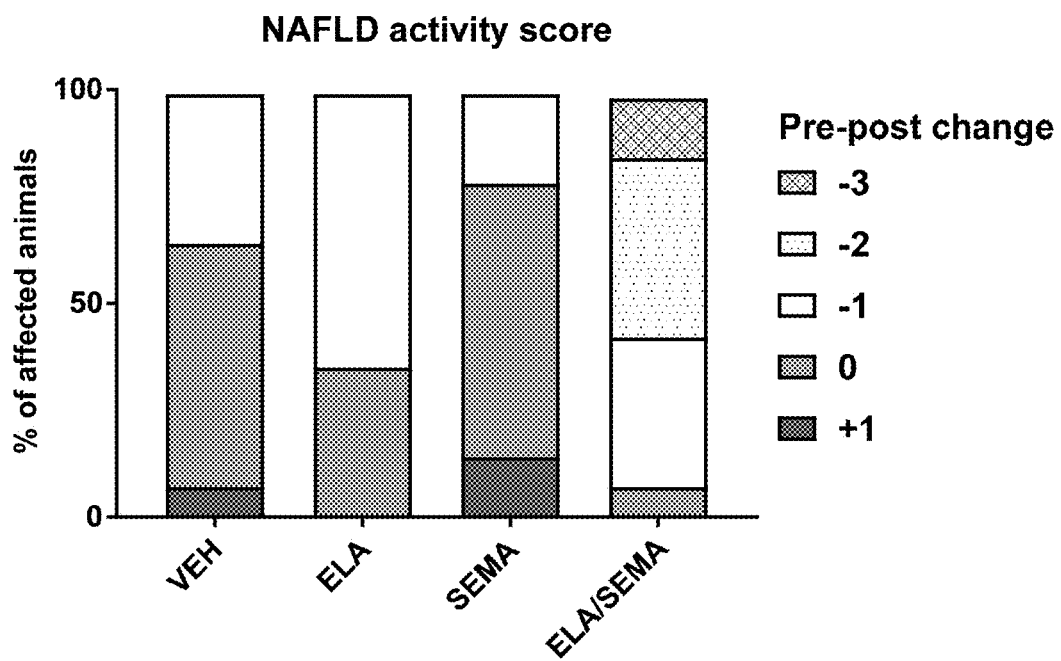
FIG. 8A: Effect of the combination of 10 mg/kg/day of ELA and 0.3 nmol/kg/day of semaglutide on the NAFLD activity score in DIO-NASH mice after 12 weeks of treatment.
Figure 8B:
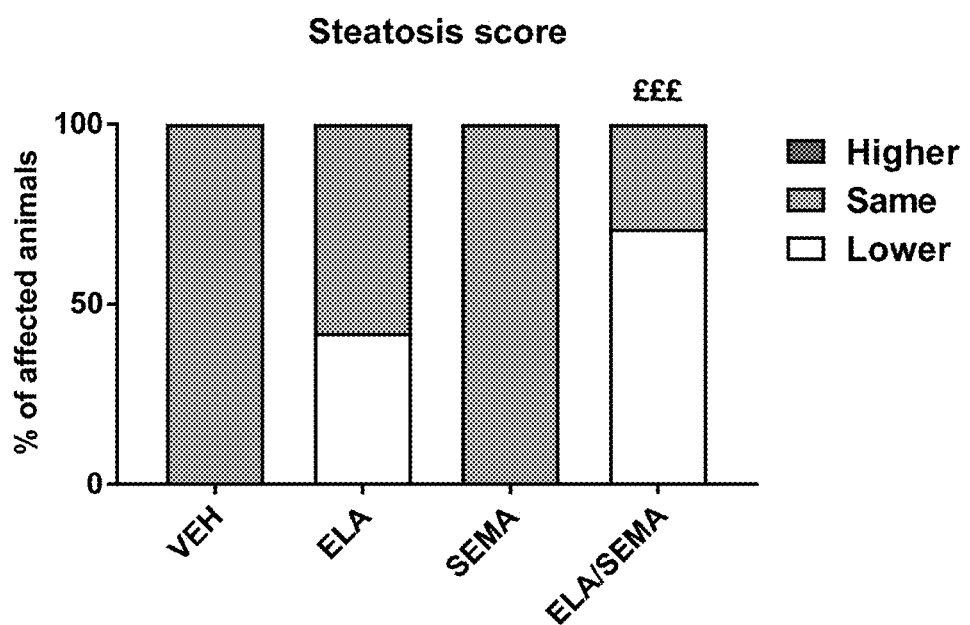
FIG. 8B: Effect of the combination of 10 mg/kg/day of ELA and 0.3 nmol/kg/day of semaglutide on steatosis in DIO-NASH mice after 12 weeks of treatment.
Figure 8C:
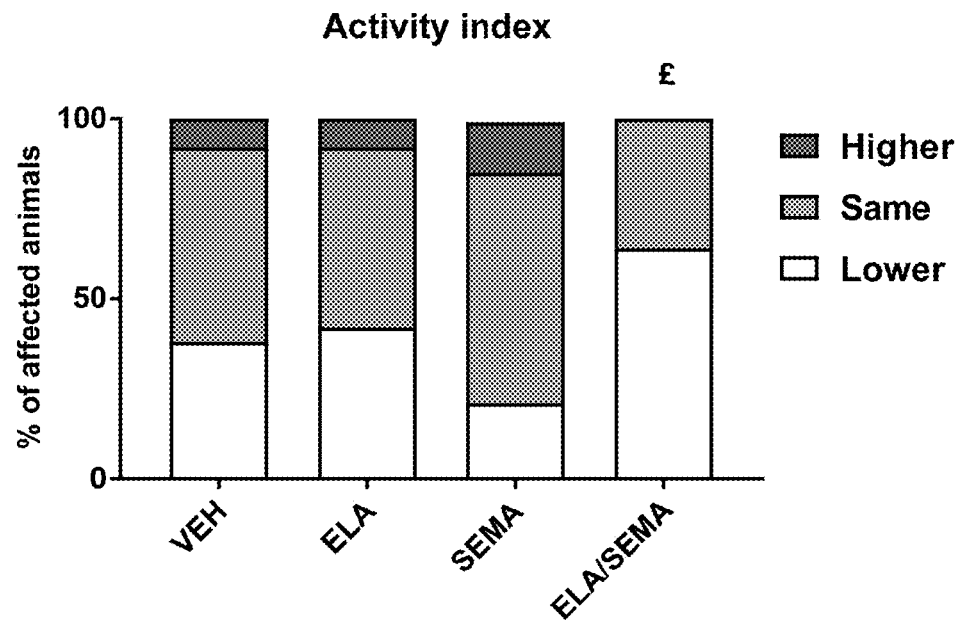
FIG. 8C: Effect of the combination of 10 mg/kg/day of ELA and 0.3 nmol/kg/day of semaglutide on the activity index (sum of ballooning and inflammation scores) in DIO-NASH mice after 12 weeks of treatment.
Figure 8D:
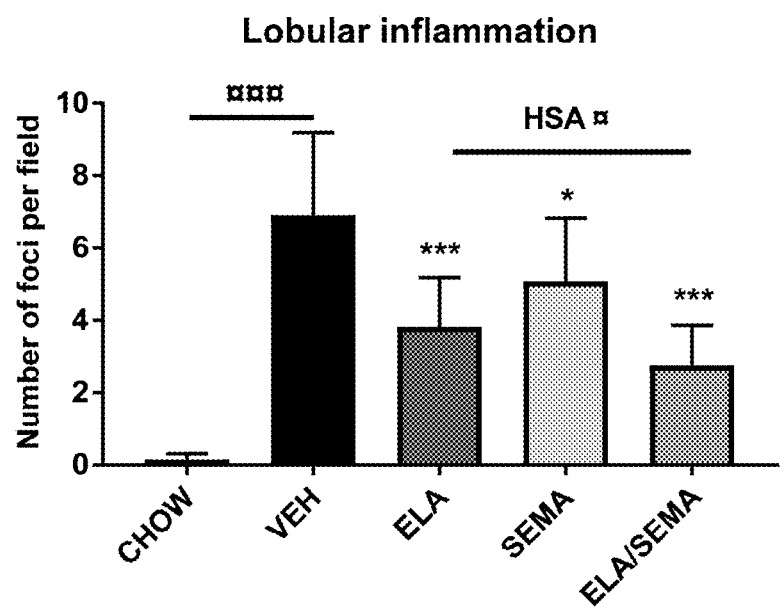
FIG. 8D: Effect of the combination of 10 mg/kg/day of ELA and 0.3 nmol/kg/day of semaglutide on lobular inflammation in DIO-NASH mice after 12 weeks of treatment.

At inclusion, mice had a severe NASH phenotype (NAFLD activity score (NAS) between 5 and 7, and fibrosis stage of at least 2. Following 12 weeks of treatment with the ELA/SEMA combo, NAS decreased by 3 stages in 14% of mice, and by 2 stages in 44% of mice (FIG. 8A). None of the mice that received either a low dose of ELA or a low dose of SEMA showed NAS reduction beyond 1 stage. This drop was accounted for by a decrease in both steatosis (FIG. 8B) and activity index (FIG. 8C). The number of hepatic inflammatory foci notably dropped with the combo treatment (−59%) (FIG. 8D).

Biochemical Analyses

Liver samples were homogenized, and triglycerides (TG) were extracted in 5% NP-40 by heating. Hepatic TG content as well as plasma alanine aminotransferase (ALT) and aspartate aminotransferase (AST) levels were measured using commercial kits (Roche Diagnostics) and Cobas™ C-501 autoanalyzer according to the manufacturer's instructions. Plasma C-reactive protein (CRP) concentration was measured by ELISA (Mouse C-Reactive Protein/CRP Immunoassay MCRP00, R&D Systems). Hepatic collagen was assessed using colorimetric detection of hydroxyproline, a major component of collagen (QZBhypro, Quickzyme).

Figure 9A:
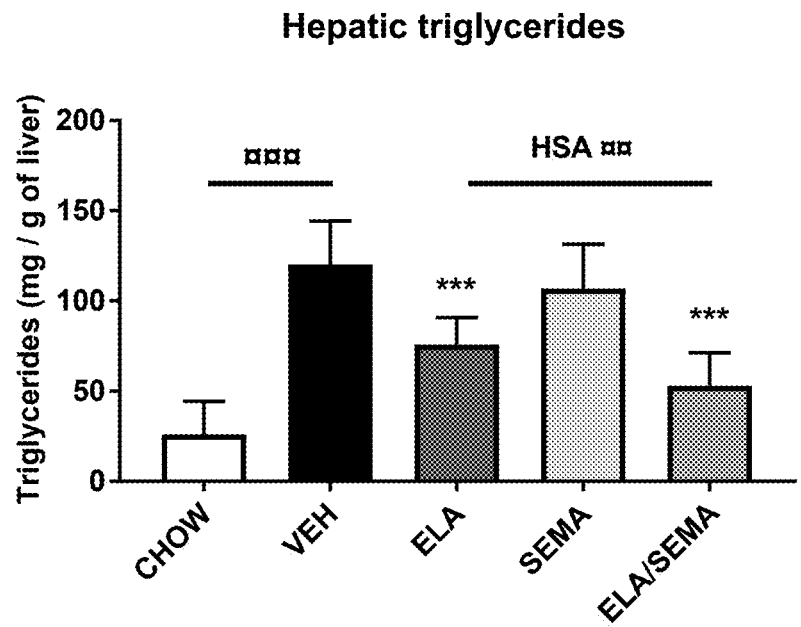
FIG. 9A: Effect of the combination of 10 mg/kg/day of ELA and 0.3 nmol/kg/day of semaglutide on hepatic triglyceride content (TG) in DIO-NASH mice after 12 weeks of treatment.
Figure 9B:
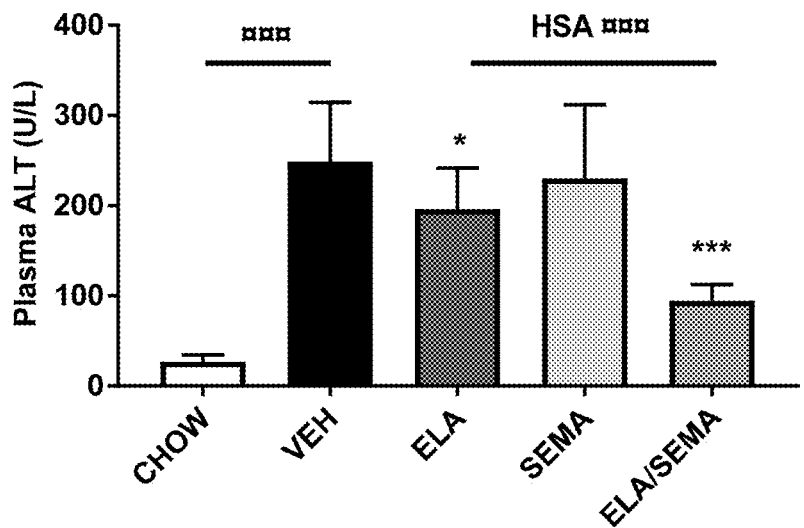
FIG. 9B and FIG. 9C: Effect of the combination of 10 mg/kg/day of ELA and 0.3 nmol/kg/day of semaglutide on plasma transaminases (ALT (FIG. 9B and AST (FIG. 9C)) in DIO-NASH mice after 12 weeks of treatment.
Figure 9C:
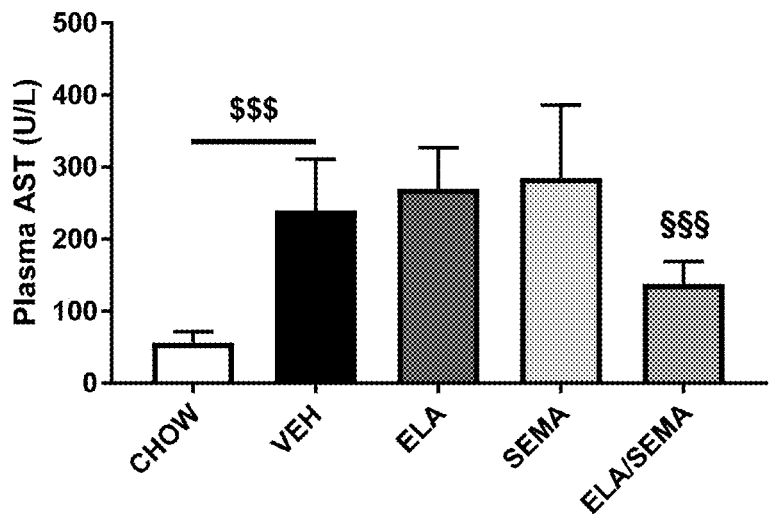
Figure 9D:
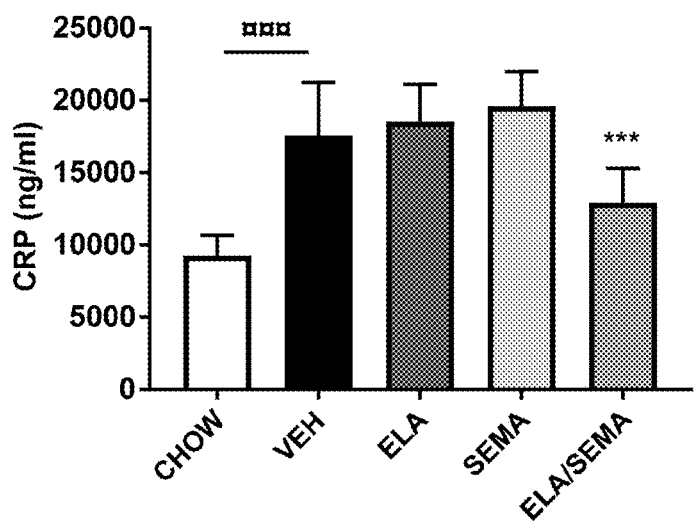
FIG. 9D: Effect of the combination of 10 mg/kg/day of ELA and 0.3 nmol/kg/day of semaglutide on CRP in DIO-NASH mice after 12 weeks of treatment.
Figure 9E:
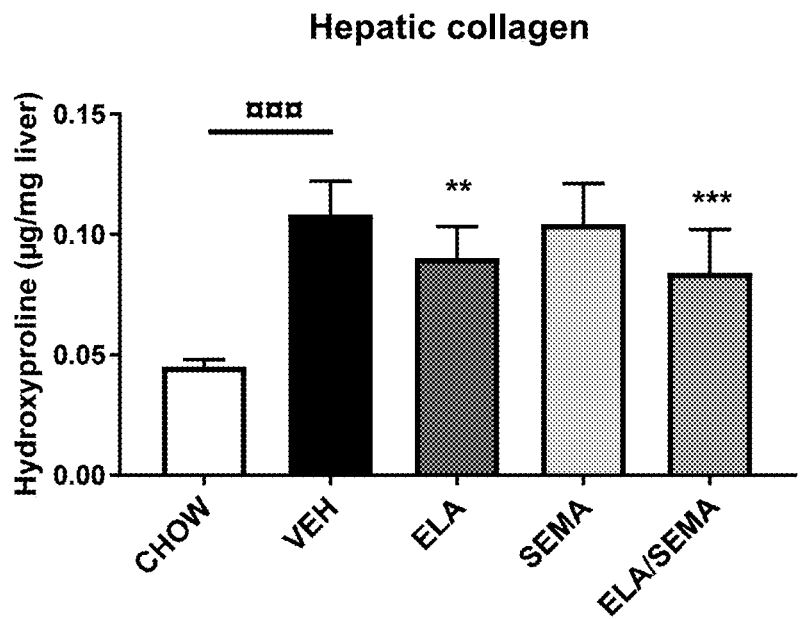
FIG. 9E: Effect of the combination of 10 mg/kg/day of ELA and 0.3 nmol/kg/day of semaglutide on hepatic hydroxyproline in DIO-NASH mice after 12 weeks of treatment.

ALT and AST are liver enzymes which concentrations increase in plasma in case of hepatocellular injury. Plasma CRP is a marker of hepatic inflammation that is typically elevated in metabolic diseases with low grade inflammation such as NASH, and correlates with the cardiovascular risk in clinic. As expected, plasma ALT, AST and CRP levels were elevated after 47 weeks of AMLN diet. Interestingly, a strong decrease in plasma ALT (−60%), AST (−56%) and CRP (−56%), as well as in liver triglycerides (−56%) was also observed in the ELA/SEMA arm, corroborating the effect on liver histology (FIG. 9A-D). Fibrosis improvement was observed in animals that received ELA and combination with SEMA tended to further decrease the hepatic collagen content (FIG. 9E).

Transcriptomic Analysis

Total RNA was isolated from mice livers using Nucleospin® 96 RNA kit (Macherey Nagel) following manufacturer's instructions. Illumina NexSeq 500 sequencing technology was used to generate RNAseq data on the livers (n=5 per group). The raw FASTQ files are trimmed at the 3' end in function of their quality score (Phred score). The parameters used are an end minimum quality level of 25 and a minimum read length of 50. The unaligned reads were aligned to the *Mus musculus* mm10 reference genome using the software STAR version 2.5.3. The default parameters are used. A count table was produced using featureCounts v1.5.3 with default parameters. To identify differentially expressed genes (DE genes), we used R (version 3.5.3) and the DESEq2 library (v. 1.22.2). Briefly, the count matrix produced by FeatureCounts was analyzed by the DESeqDataSetFromMatrix( ) function followed by the DEseq( ) function from the DESeq2 library. For each condition (i.e., comparison ELA/SEMA vs AMLN), the fold change and the p-value were retrieved using the results( ) function from DESeq2. Genes with an adjusted p-value<0.01 and |fold change|>1.5 were considered as DE genes. The different tables were merged using the Ensembl ID as a key. Gene annotations were retrieved using the biomaRt library (v. 2.38.0). Upon selection of DE genes per condition, gene ontology analysis was performed using Metascape.

Figure 10A:
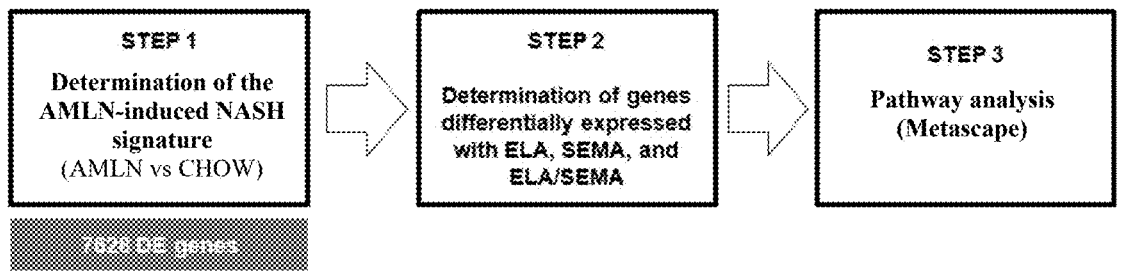
FIG. 10A.
Figure 10B:
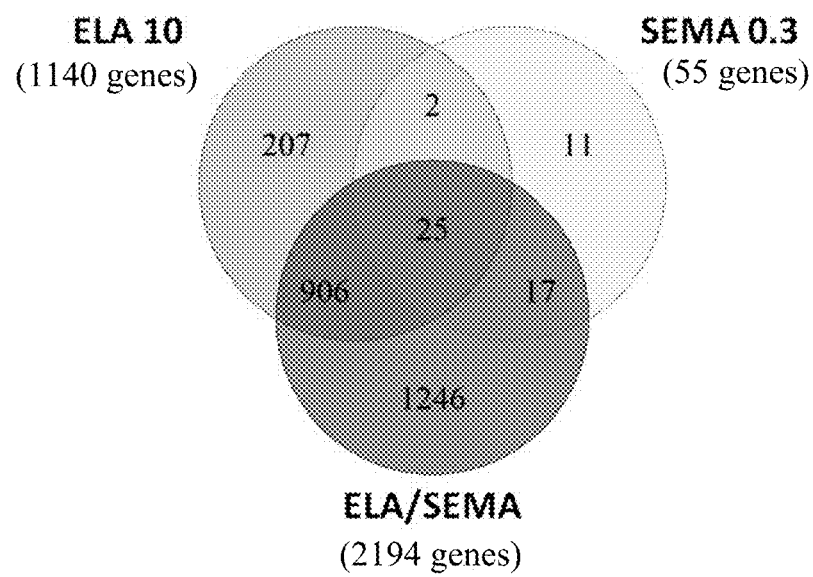
FIG. 10B: Venn diagram of the genes involved in the ELA/SEMA combination in the transcriptomic analysis of the livers after 12 weeks of treatment with ELA (10 mg/kg/day), SEMA (0.3 nmol/kg/day) and their combination in DIO-NASH mice.
Figure 10C:
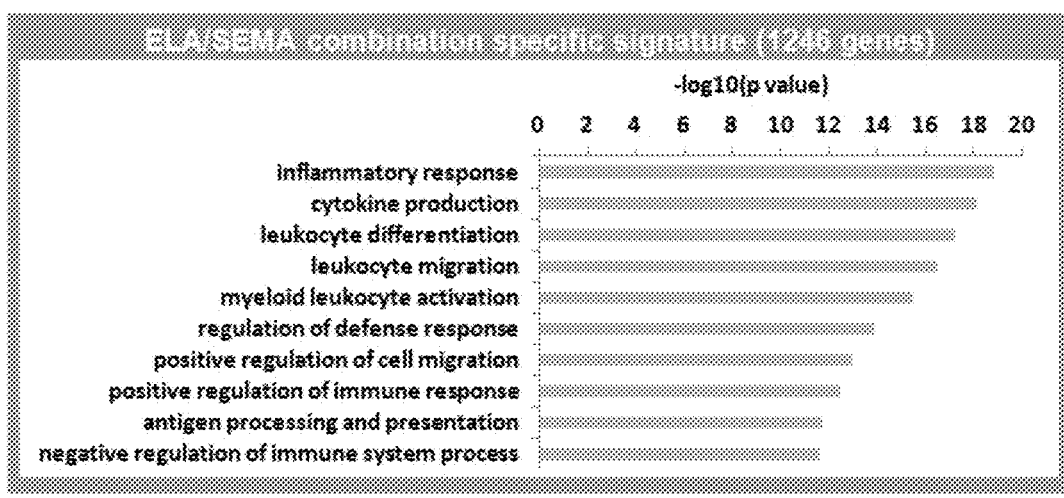
FIG. 10C: List of the top ten pathways enriched with ELA/SEMA combination in the transcriptomic analysis of the livers after 12 weeks of treatment with ELA (10 mg/kg/day), SEMA (0.3 nmol/kg/day) and their combination in DIO-NASH mice.
Figure 10D:
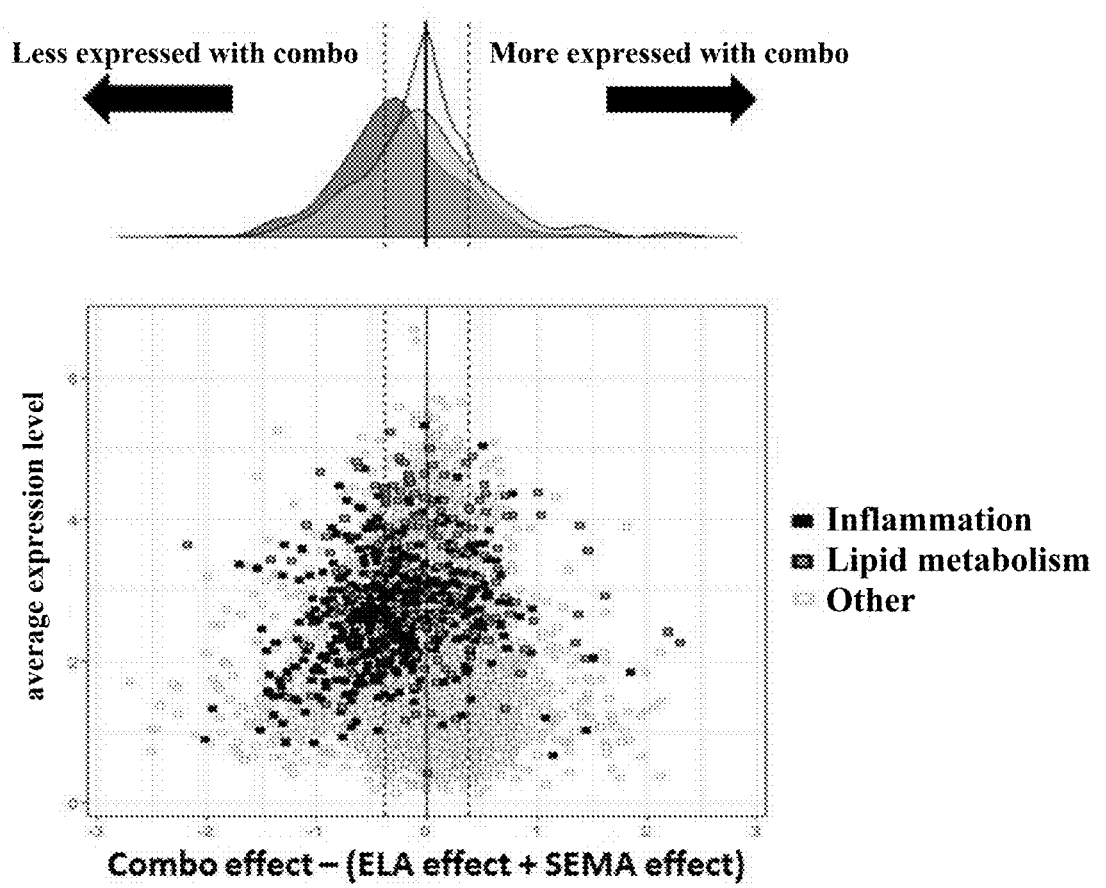
FIG. 10D: Dot plot shows the synergy of ELA/SEMA combination on genes involved in inflammatory pathways in the transcriptomic analysis of the livers after 12 weeks of treatment with ELA (10 mg/kg/day), SEMA (0.3 nmol/kg/day) and their combination in DIO-NASH mice.
Figure 10E:
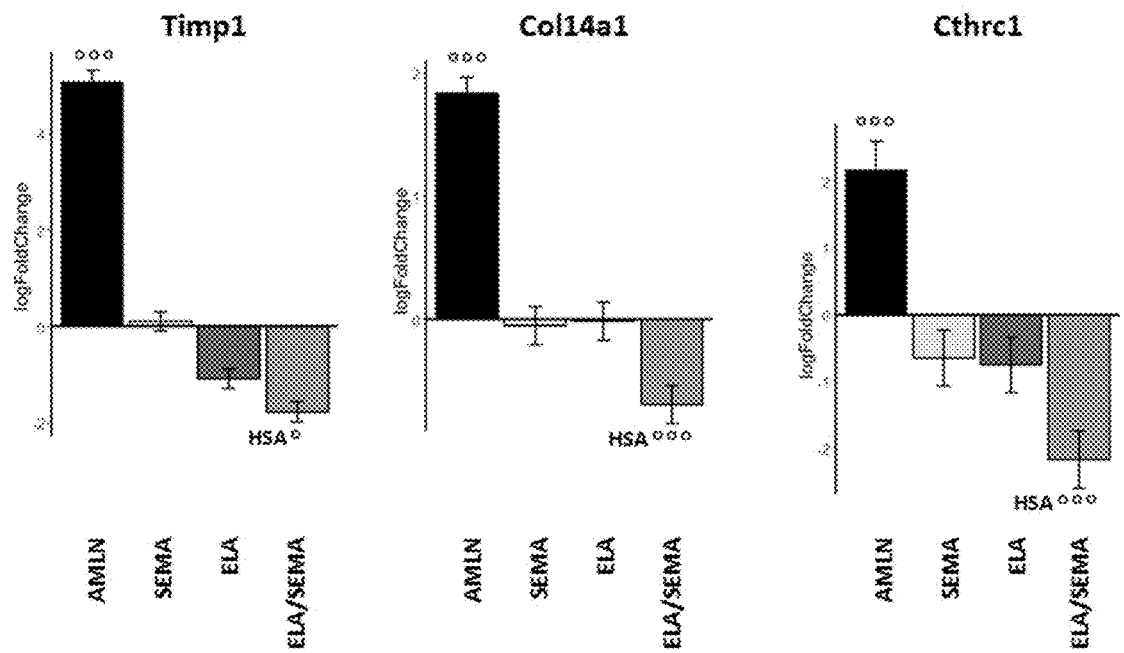
FIG. 10E: Expression of fibrotic genes in the transcriptomic analysis of the livers after 12 weeks of treatment with ELA (10 mg/kg/day), SEMA (0.3 nmol/kg/day) and their combination in DIO-NASH mice.

A profound liver transcriptome remodeling was documented. A set of 2194 genes was differentially modulated in the ELA/SEMA combo arm vs 1140 and 55 genes in ELA and SEMA monotherapy arms, respectively (FIG. 10A-B). SEMA treatment only modestly affected the expression of lipid metabolism-related genes. Surprisingly, the transcriptomic signature of ELA/SEMA combination in the liver was particularly enriched for inflammatory pathways, and especially, myeloid cell markers were selectively reduced in animals that received the combination (FIG. 10C-D). Moreover, some fibrotic genes were selectively reduced with the combination treatment (FIG. 10E) suggesting a therapeutic benefice of the combination to slow down fibrosis progression.

Combination of low doses of elafibranor and semaglutide alleviates severe NASH phenotype and liver injury markers in AMLN diet-induced disease model. Transcriptomic analysis reveals that ELA and SEMA synergize to specifically reduce the inflammatory infiltration in the liver and attenuate fibrogenesis.

Example 4: Combination of Elafibranor with GLP-1 Receptor Agonists Synergistically Inhibits Activation of Immune Cells Combination Treatment in LPS-Activated Macrophages Human_THP-1 monocytes were seeded at a density of 25,000 cells per well in 384-well plate in RPMI1640 (Gibco, 21875) supplemented with 10% FBS, 1% Penicillin-streptomycin (Gibco, 15140122) and 25 mM Hepes (Gibco, 15630080) and differentiated into macrophages using PMA (Phorbol 12-myristate 13-acetate, Sigma, P8139) at the final concentration of 100 ng/ml for 24 hours.

A 2 component combination matrix was prepared. ELA and GLP-1 receptor agonists stocks were serially diluted in DMSO in 3-points series in a row (ELA) and a 8-points series in a column of a 96-well plate for GLP1RA. Subsequently, the 3×8 combination matrix was generated by 1:1 mixing of all single agent concentrations.

After 24 hrs with PMA, medium was removed, and replaced by serum free RPMI. Then, the serum-deprived THP1 macrophages were preincubated for 24 hrs with the compounds followed by addition of lipopolysaccharide LPS (E. coli 055 B5) (Sigma, L6529) for an additional 6 hrs period.

Human TNFα was quantified in the supernatant using the HTRF technology (Homogeneous Time Resolved Fluorescence (Cisbio 62HTNFAPEG), based on (Fluorescence Resonance Energy Transfer) FRET technology. Cell supernatants, samples and standards were dispensed directly into the assay plate for the detection by HTRF® reagents. The antibodies labeled with the HTRF donor and acceptor are pre-mixed and added in a single dispensing step. Signal intensity detected at 665 nm is proportional to the number of antigen-antibody complex formed and therefore to the TNFα concentration. Seven points standard curve (from 39 pg/ml to 2500 pg/mL with supplied human TNFα) was obtained by fitting the data with the 4 Parameter Logistic model.

Synergism between compounds was determined using the Excess Over Bliss (EOB) method.

The values obtained in the TNFα HTRF assay were first transformed into percentage inhibitions over LPS control. Then, using these percentage inhibitions, EOB were calculated. Expected Bliss additivism score (E) was firstly determined by the equation: $E=(A+B)-(A\times B)$ where A and B are the percentage inhibition of elafibranor (A) and GLP-1 analogue (B) at a given dose. The difference between the Bliss expectation and the observed inhibition of the combined ELA/GLP-1 analogue at the same dose is the 'Excess over Bliss' score.

Excess over Bliss score=0 indicates that the combination treatment is additive (as expected for independent pathway effects);

Excess over Bliss score>0 indicates activity greater than additive (synergy); and Excess over Bliss score <0 indicates the combination is less than additive (antagonism).

The total Bliss score was calculated by addition of all EOB.

Figure 11:
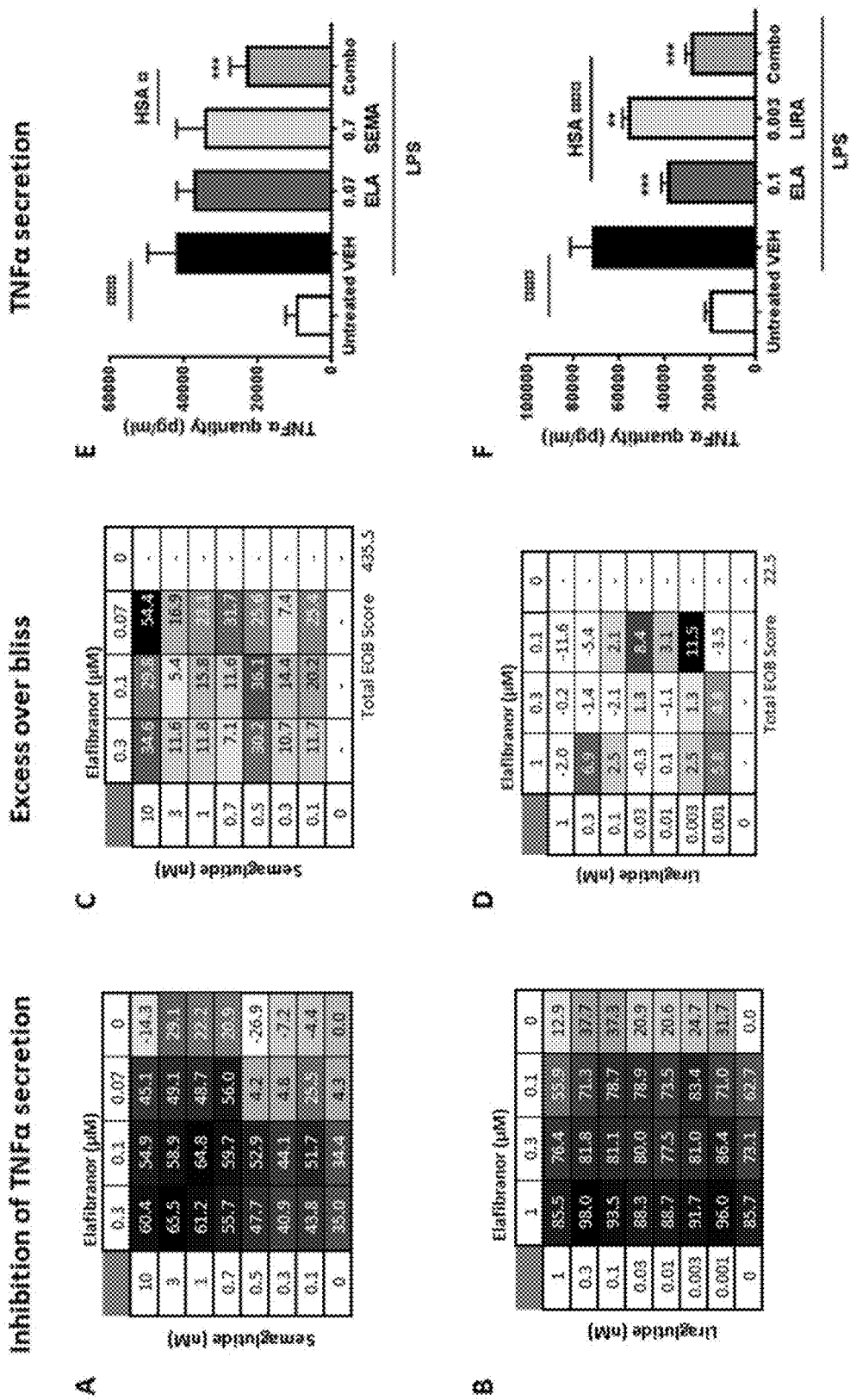
FIGS. 11A-11F: Combination of elafibranor with GLP-1 receptor agonists synergistically inhibits TNFα secretion in LPS-activated macrophages.

Metabolic diseases such as NAFLD/NASH are associated with low-grade inflammation. Activation of immune cells produces cytokines that alter the metabolic functions of the liver and peripheral organs (adipose tissue, pancreas . . . ). Gut permeability, described in metabolic and hepatic diseases, results in increased circulating bacterial components, such as LPS, that activate macrophages in the liver and peripheral organs (adipose tissue). Given the synergy between elafibranor and semaglutide in Example 3 on inflammatory pathways, we investigated whether elafibranor and different GLP-1 receptor agonists could synergize to inhibit macrophage activation by LPS. In the THP1 monocytes differentiated into macrophages, LPS treatment activates macrophages, as measured by TNFα secretion which increases approximately 4-fold with LPS (FIGS. 11 E-F). The maximal effect of elafibranor alone was observed with the dose of 1 µM and reached 85% inhibition of TNFα secretion (FIG. 11B). On the contrary, the maximal effect of GLP-1 receptor agonists was 29% and 38% of TNFα inhibition for semaglutide and liraglutide, respectively (FIGS. 11A-B). As observed in vivo (Example 3), the combination of elafibranor and semaglutide synergizes to reduce inflammation at low doses: 0.07 µM of elafibranor synergized with 0.7 nM semaglutide to reduce TNFα secretion by 56% (FIG. 11E). Surprisingly, 0.1 µM elafibranor also synergized with liraglutide (0.003 nM) to reduce TNFα secretion by 83% (FIG. 11F).

These results show the capacity of elafibranor to synergize with different GLP-1 receptor agonists to reduce the inflammatory tone observed in a number of diseases, including NASH and metabolic diseases.

Example 5: Combination of Elafibranor with GLP-1 Receptor Agonists Synergistically Inhibits Hepatic Stellate Cells (HSC) Activation Combination Treatment in TGFβ-Stimulated HSC The human primary hepatic stellate cells (hHSC) (Innoprot) were cultured in STeCM medium (ScienCell cat #5301) that was supplemented with 2% fetal bovine serum (FBS, ScienCell cat #0010), 1% penicillin/streptomycin (ScienCell cat #0503) and stellate cell growth supplement (SteCGS; ScienCell cat #5352). Cell culture flasks were coated with Poly-L Lysine (Sigma cat #P4707) for a better adherence.

A 2 component combination matrix was prepared. ELA and GLP-1 receptor agonists stocks were serially diluted in DMSO in 3-points series in a row (ELA) and a 7-points series in a column of a 96-well plate for GLP-1 receptor agonists. Subsequently, the 3×7 combination matrix was generated by 1:1 mixing of all single agent concentrations.

The cells were subsequently plated at a density of 6500 cells/well into 384-well plates. The next day, cell-culture medium was removed, and cells were washed with PBS (Invitrogen cat #14190). hHSC were deprived for 24 hours in serum-free and SteCGS-free medium. For the treatments with ELA, GLP-1 receptor agonists and the respective combinations, the serum-deprived hHSC were preincubated for 1 hour with the compounds followed by addition of the profibrogenic stimuli TGF-β1 (PeproTech cat #100-21, 3 ng/mL) in serum-free and SteCGS-free medium for an additional 48 hour period.

Human α-smooth muscle actin (αSMA) was quantified in the cell lysates using the HTRF technology (Homogeneous Time Resolved Fluorescence (Cisbio 62HTNFAPEG), based on (Fluorescence Resonance Energy Transfer) FRET technology. Diluted cell lysates, samples and standards were dispensed directly into the assay plate for the detection by HTRF® reagents. The antibodies labeled with the HTRF donor and acceptor are pre-mixed and added in a single dispensing step. HTRF ratio of signal intensity detected at 665 nm over signal at 620 nm is proportional to the number of antigen-antibody complex formed and therefore to the αSMA concentration.

Figure 12:
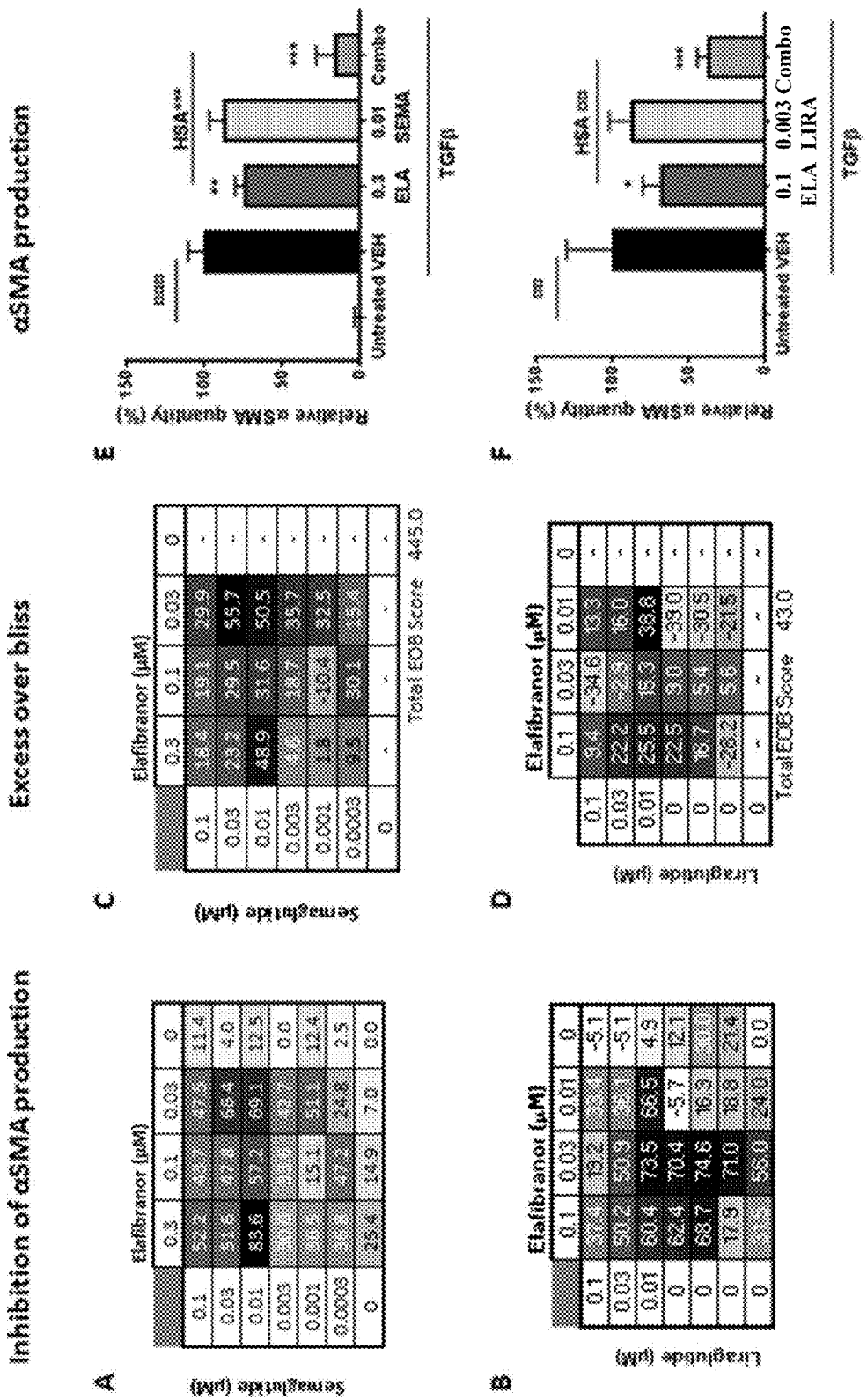
FIGS. 12A-12F: Combination of elafibranor with GLP-1 receptor agonists synergistically inhibits αSMA production in TGFβ-stimulated hepatic stellate cells. Combinations were tested in a dose-response matrix format (FIG. 12A, FIG. 12B) and analyzed according to the Excess Over Bliss (EOB) additivism model (FIG. 12C, FIG. 12D). αSMA production was plotted in a bar graph representation for representative synergistic combinations (FIG. 12E, FIG. 12F). Data are presented as mean (quadruplicates)±standard deviation (SD).

Following liver injury, quiescent HSCs undergo a process of activation that is characterized by a differentiation into α-SMA-positive myofibroblasts. Elafibranor has an antifibrotic activity in hHSC activated with the profibrogenic cytokine TGFβ1. The α-SMA production was reduced by 61% with 3 μM of ELA (not shown). Semaglutide and liraglutide alone only modestly reduced α-SMA production (Emax −12% with semaglutide, Emax −30% with liraglutide). However, elafibranor synergizes with semaglutide and liraglutide to reduce α-SMA production in activated HSCs (FIG. 12). One of the best example of synergy is shown in FIG. 12E with 0.3 μM of ELA and 0.01 μM of semaglutide reaching 84% inhibition of αSMA production. Likewise, while 0.003 μM of liraglutide alone does not show any antifibrotic activity, its addition to 0.1 μM of elafibranor reduced αSMA production in a synergistic manner and reached up to 62% of inhibition (FIG. 12F).

These results confirm that elafibranor and GLP-1 receptor agonists synergize to reduce fibrogenesis, offering a therapeutic potential for fibrosing NASH.

Example 6: Effect of 8 Weeks of Treatment with Elafibranor Alone and in Combination with Liraglutide on Adiposity, Blood Glucose and Liver in a Murine Model of Diet-Induced NASH Animal Model Male C57BL/6NTac mice (Taconic, USA) were fed with the GAN diet (D09100310 Research Diet) 31 weeks prior to study start to induce NASH pathology (NASH-B6 model). Prior to treatment, blood was collected by retro-orbital sinus puncture after a 6 h-fasting period to measure plasma ALT, AST, TIMP Metallopeptidase Inhibitor 1 (TIMP1, a surrogate marker of liver fibrosis). Blood glucose was measured directly from the tail vein using a WellionVet glucometer (CALEA) after a 6 h-fasting period. Ketone bodies (KB) was also measured directly from the tail vein using a FreeStyle Optium Neo ketometer. Mice were randomized into treatment groups (n=10/group) based on body weight, glycemia, ketonemia and plasma ALT, AST and TIMP1. They received either vehicles, elafibranor (3 mg/kg/day, per os), liraglutide (0.01 mg/kg, BID, SC) or both elafibranor and liraglutide for 8 weeks. To avoid GLP-1 receptor agonist-induced hypophagia, an up-titration protocol was applied for liraglutide during the first 3 weeks of treatment (starting with 0.001 mg/kg BID). Vehicle-dosed chow-fed mice served as additional controls (R03-10 U8211G10R, SAFE).

Body weight and food intake were monitored each day during the treatment period. On the last day of treatment, serum samples were obtained after retro-orbital sinus puncture blood sampling and mice were sacrificed. The liver was rapidly excised for histology and biochemical and transcriptomic analyses. The epididymal adipose tissues were weighed.

All animal procedures were performed according to standard protocols and in accordance with the standard recommendations for the proper care and use of laboratory animals.

Figure 13A:
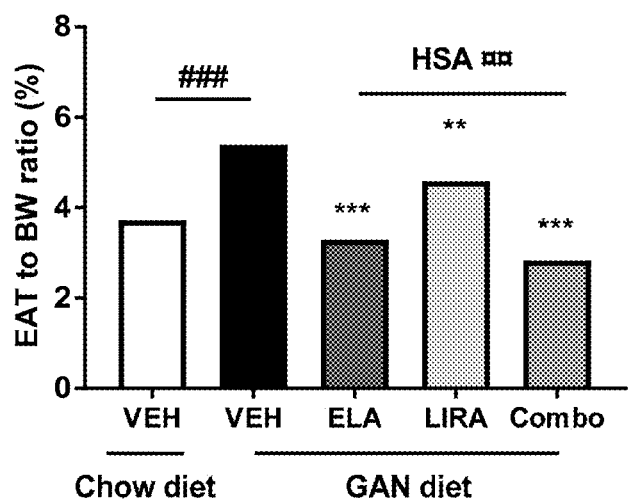
FIG. 13A: Effect of the combination of 3 mg/kg/day of ELA and 0.02 mg/kg/day of liraglutide on adiposity in NASH-B6 mice after 8 weeks of treatment. Epididymal adipose tissue (EAT) weight is expressed as the ratio to body weight (BW) in each mouse.
Figure 13B:
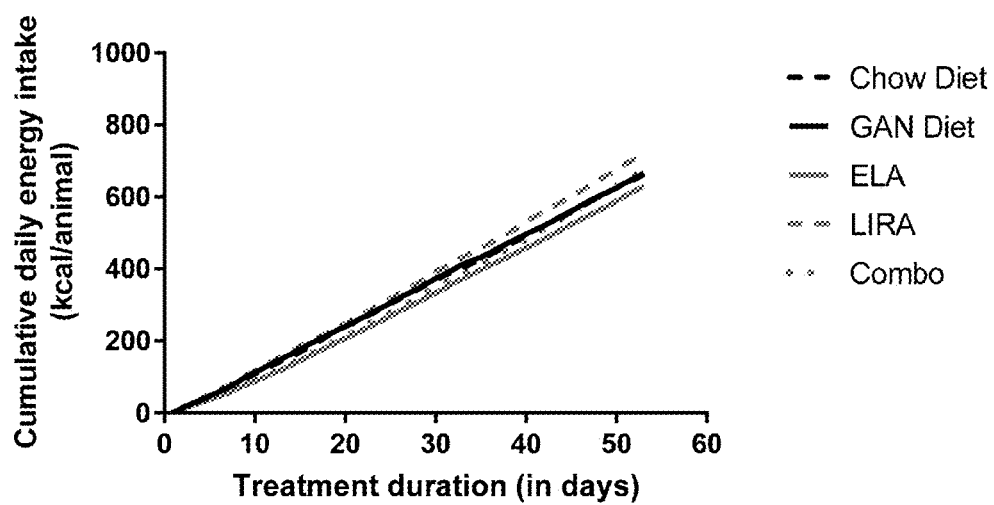
FIG. 13B: Effect of the combination of 3 mg/kg/day of ELA and 0.02 mg/kg/day of liraglutide on energy consumption in NASH-B6 mice after 8 weeks of treatment.

After 39 weeks of GAN feeding, NASH-B6 mice were obese (48 g). Eight weeks of treatment with elafibranor, in combination or not with liraglutide, decreased body weight by 15% (not shown). Adiposity was decreased by elafibranor and further reduced with the combination treatment (FIG. 13A). Thanks to the suboptimal drug doses used in this study, liraglutide had no hypophagia effect (FIG. 13B).

Biochemical Analyses

Hepatic collagen content was determined using the appropriate QuickZyme kit (Total collagen assay, cat #QZB-totco12). The assay is based on the detection of hydroxyproline, which is a non-proteinogenic amino acid mainly found in the triple helix of collagen. Thus, hydroxyproline in tissue hydrolysates can be used as a direct measure of the amount of collagen present in the tissue (without discrimination between procollagen, mature collagen and collagen degradation products). Complete hydrolysis of tissue samples in 6M HCl at 95° C. is required before dosing the hydroxyproline. The assay results in the generation of a chromogen with a maximum absorbance at 570 nm. Results are expressed as μg of collagen/mg of liver.

Figure 14:
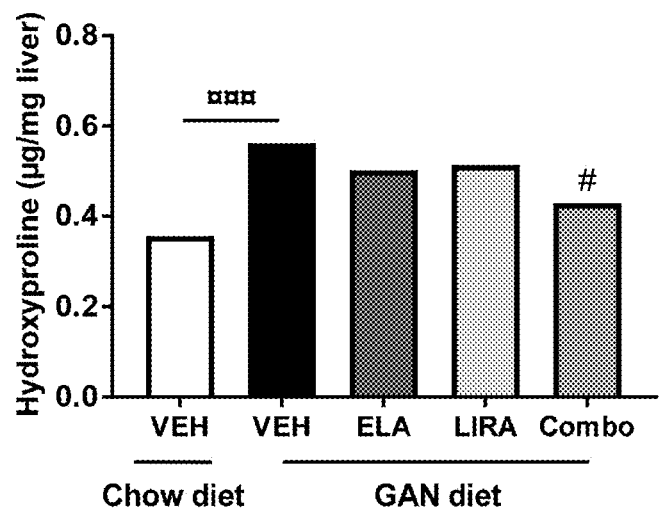
FIG. 14: Effect of the combination of 3 mg/kg/day of ELA and 0.02 mg/kg/day of liraglutide on hepatic collagen content in NASH-B6 mice after 8 weeks of treatment.

NASH-B6 mice developed liver lesions characterized by a maximal steatosis score of 3 in all the mice, lobular inflammation and collagen deposition (not shown). The combination treatment significantly reduced collagen content whereas monotherapies had no significant effect (FIG. 14), suggesting that at these low doses, only the combination treatment was able to alleviate liver injury.

Hepatic Gene Expression Analysis

Total RNA was isolated from mice livers using Nucleospin® 96 RNA kit (Macherey Nagel) following manufacturer's instructions. Total RNA were reverse transcribed into cDNA using M-MLV RT (Moloney Murine Leukemia Virus Reverse Transcriptase) (Invitrogen cat #28025) in 5×RT buffer (Invitrogen), 10 mM DTT (Invitrogen), 10 mM dNTPs (Promega), 200 ng pdN6 (Amersham) and 40U of RNase inhibitor (Promega). Quantitative PCR was then carried out using the CFX96 Touch™ Real-Time PCR Detection System (Biorad). Briefly, the PCR reactions were performed in 96-WP format in 25 μl of total volume containing 5 μL of reverse transcription reaction, 0.5 μL of reverse and forward primers (10 mmol each), and 12.5 μl of 2×iQ SYBR Green Supermix (BioRad), using the following primer sequences:

| Gene | Forward primer | Reverse primer |
| --- | --- | --- |
| Col1α1 | 5'-AGGCGAACAAGGTGACAGAG-3'<br>(SEQ ID NO: 1) | 5'-GCCAGGAGAACCAGCAGAG-3'<br>(SEQ ID NO: 2) |
| NONO | 5'-TGACTGTGGAGCCTATGGACCA-3'<br>(SEQ ID NO: 3) | 5'-CTCAAAGGAGCCAGGTTGTGCA-3'<br>(SEQ ID NO: 4) |

Expression levels were normalized using the expression of NONO gene as a housekeeping gene in samples. The standard curves were drawn by selecting the best points (at least three points) in order to have PCR reaction efficiency close to 100% and a correlation coefficient close to 1. Expression levels were determined using the standard curve equation for both the housekeeping gene and the target gene (taking into account the specific PCR efficiency of each target gene).

Figure 15:
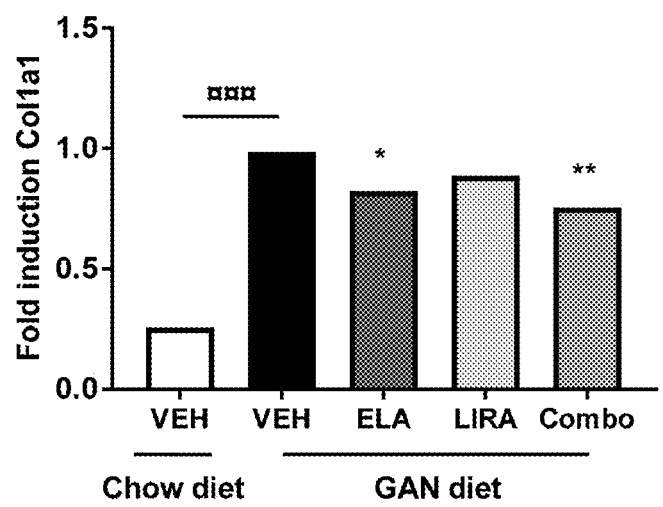
FIG. 15: Effect of the combination of 3 mg/kg/day of ELA and 0.02 mg/kg/day of liraglutide on fibrotic gene expression in the liver of NASH-B6 mice after 8 weeks of treatment.

As expected, the expression of the fibrotic gene Col1a1 was induced in NASH-B6 mice with GAN feeding (FIG. 15). Col1a1 expression was decreased with elafibranor treatment and further reduced with liraglutide combination.

Figure 16:
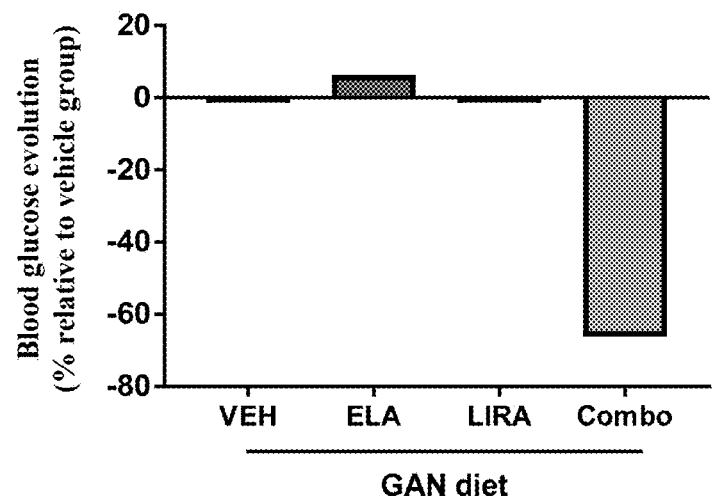
FIG. 16: Effect of the combination of 3 mg/kg/day of ELA and 0.02 mg/kg/day of liraglutide on blood glucose evolution before and after 8 weeks of treatment in NASH-B6 mice.

Blood glucose was assessed before and after 8 weeks of treatment, after a 6 h-fasting period, directly from the tail vein using a WellionVet glucometer (CALEA). FIG. 16 shows the evolution of blood glucose with the treatments compared to that of the vehicle group fed with GAN diet. In this study, ELA (3 mg/kg/day) and liraglutide (0.02 mg/kg/day) had no effect on glycemia. However, the combination treatment drastically reduced glycemia by 66%.

These results show that elafibranor synergizes also with liraglutide to decrease adiposity, alleviate liver lesions, reduce fibrogenesis and improve glucose homeostasis, confirming the therapeutical benefice of a combination therapy between elafibranor and GLP-1 receptor agonists to treat patients with type 2 diabetes and NASH. This synergy allows reduction of the therapeutic doses of GLP-1 receptor agonists, therefore limiting their adverse effects.

Example 7: Elafibranor Potentiates the Effect of Low Doses of GLP1 Receptor Agonists Animal Model The effects of elafibranor alone, semaglutide (low and high doses) alone and their combination were assessed in DIO-NASH mice (C57BL6JRj mice fed with a Amylin Liver NASH Model diet (AMLN) (Research Diet, 40% fat (18% trans-fat), 40% carbohydrate (20% fructose), and 2% cholesterol) (35 weeks prior to study start). Mice with biopsy confirmed steatosis (score≥2) and fibrosis (score≥1) were randomized into treatment groups (n=12 per group). Mice received either vehicles, elafibranor (10 mg/kg/day, per os), low-dose semaglutide (0.3 nmol/kg/day, SC), high-dose semaglutide (10 nmol/kg/day, SC) or elafibranor (10 mg/kg/day) and semaglutide (0.3 nmol/kg/day) in combination.

On the last treatment day, plasma samples were obtained after cardiac puncture blood sampling and mice were sacrificed. The liver was rapidly excised for transcriptomic analyses.

All animal procedures were performed according to standard protocols and in accordance with the standard recommendations for the proper care and use of laboratory animals.

Plasma Markers Assessment

Alanine aminotransferase (ALT) level was measured using Cobas™ C-501 autoanalyzer according to the manufacturer's instructions. C-reactive protein (CRP) concentration was measured by ELISA (Mouse C-Reactive Protein/CRP Immunoassay MCRP00, R&D Systems).

Transcriptomic and Gene Ontology Analyses

Total RNA was isolated from mice livers using Nucleospin® 96 RNA kit (Macherey Nagel) following manufacturer's instructions. Illumina NexSeq 500 sequencing technology was used to generate RNAseq data on the livers (n=5 per group). The raw FASTQ files are trimmed at the 3' end in function of their quality score (Phred score). The parameters used are an end minimum quality level of 25 and a minimum read length of 50. The unaligned reads were aligned to the Mus musculus mm10 reference genome using the software STAR version 2.5.3. The default parameters are used. A count table was produced using featureCounts v1.5.3 with default parameters. To identify differentially expressed genes (DE genes), we used R (version 3.5.3) and the DESEq2 library (v. 1.22.2). Briefly, the count matrix produced by FeatureCounts was analyzed by the DESeqDataSetFromMatrix( ) function followed by the DEseq( ) function from the DESeq2 library. A list of differentially expressed (DE) gene was established for each comparison (i.e. SEMA-10 vs AMLN, SEMA-0.3 vs AMLN, ELA vs AMLN, ELA+SEMA-0.3 vs AMLN). For this, the lfcshrink( ) function of DESeq2 was used and the following cutoff were used to select DE genes: |fold change|>1.5 and adjusted p-value<0.05. These gene lists were submitted to metascape analysis (https://metascape.org/gp/index.html#/main/step1) using the default parameters.

Each metascape analysis was exported as Excel file. The files were imported in R V using the read_excel function from the readxl library (version 1.3.1). The different files were combined together to generate a table containing, for each comparison, the −log10(adj pvalue) of the gene ontology (GO) category enrichment. Furthermore, for each category, the number of DE genes found in the RNA-seq analysis was compared to the total number of gene in this GO category. Only GO categories with an adj. pvalue<0.01 in at least one comparison were retrieved.

Figure 17:
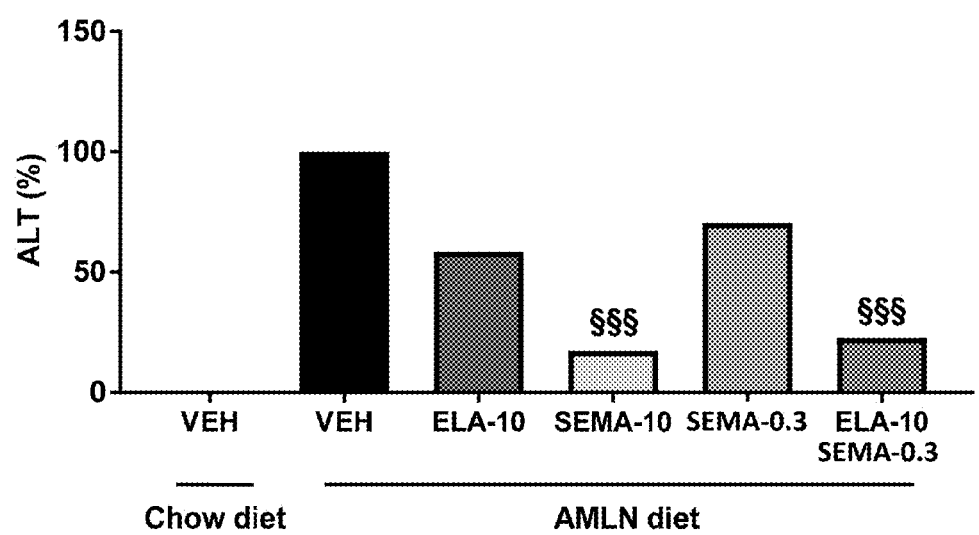
FIG. 17: Elafibranor boosts the effect of semaglutide on reducing plasma ALT concentration to a level similar as high-dose semaglutide. ALT levels in the treatment groups are expressed relative to the AMLN-fed vehicle group.

As expected, GAN diet increased the level of plasma ALT—a marker of hepatic injury used in clinics as a liver function test. The high dose of semaglutide (10 nmol/kg/day) drastically reduced ALT by 74%, whereas the low dose of semaglutide (0.3 nmol/kg/day) was inefficient (FIG. 17). Surprisingly, the combination treatment containing elafibranor and semaglutide at low dose reduced ALT levels to the same extent than treatment with high dose semaglutide (−77 vs −83%, p>0.05), suggesting that, in combination, elafibranor potentiates semaglutide effect when this later is used as low dose (FIG. 17).

Figure 18:
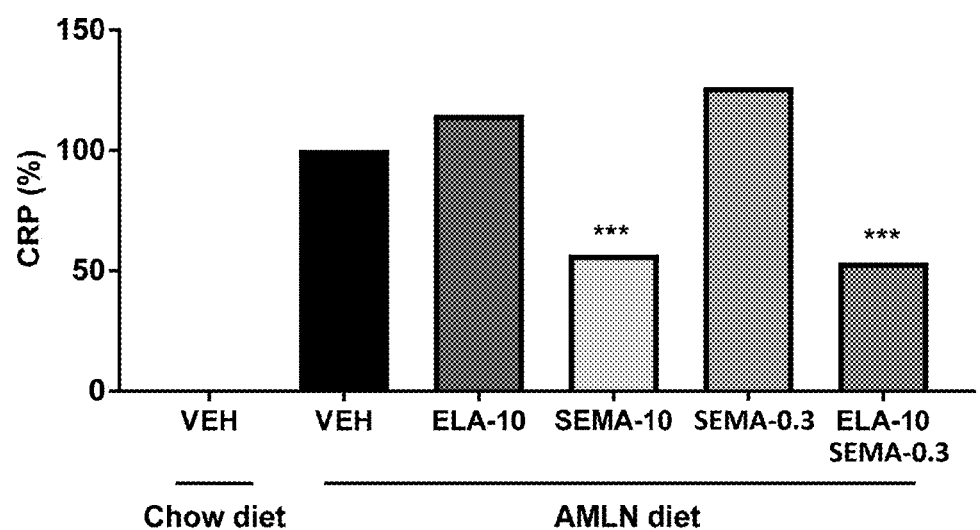
FIG. 18: Elafibranor boosts the effect of semaglutide on reducing plasma CRP concentration to a level similar to high-dose semaglutide. CRP levels in the treatment groups are expressed relative to the AMLN-fed vehicle group.

Similarly, the level of the inflammation marker CRP—also known to be associated with the risk of cardiovascular disease in humans—was decreased by 43% with high-dose semaglutide whereas low-dose semaglutide was inefficient (FIG. 18). Once again, the combination of low-dose semaglutide with elafibranor reduced CRP level to the same extent than high-dose semaglutide (−47 vs −43%, p>0.05).

Figure 19:
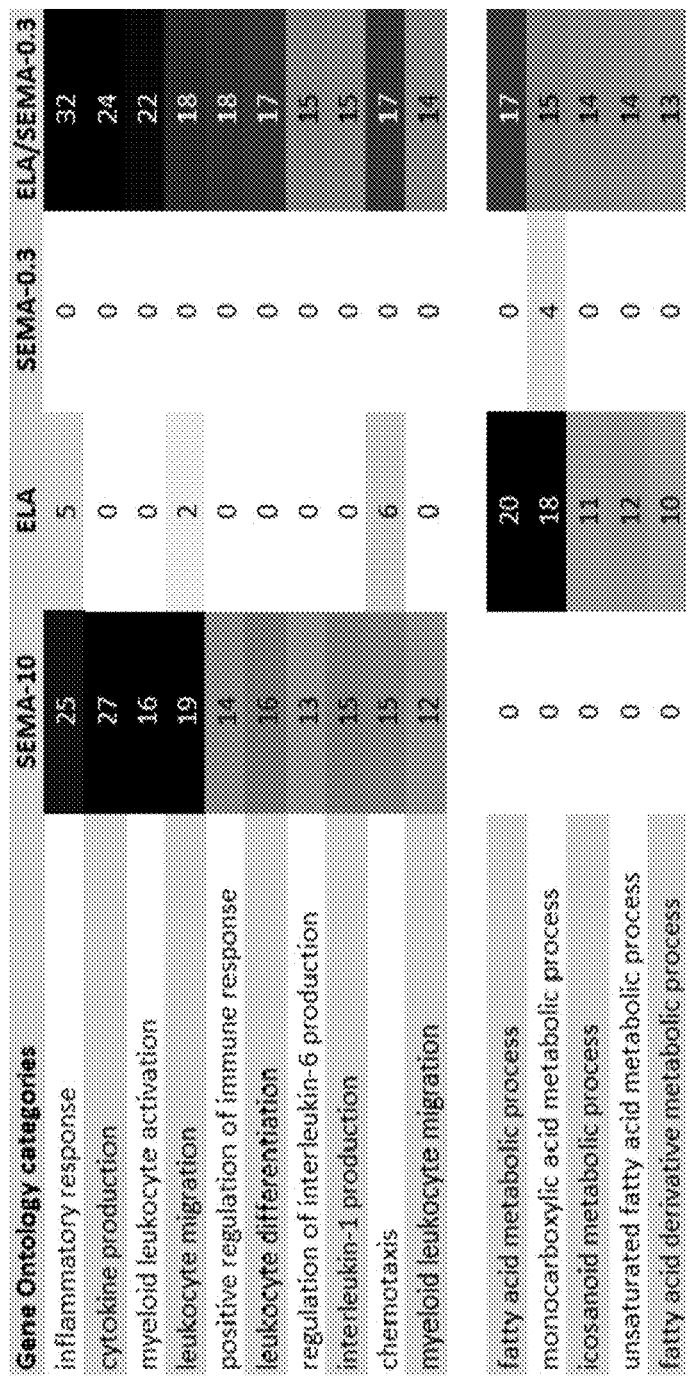
FIG. 19: Elafibranor boosts the effect of semaglutide on the liver recapitulating high-dose semaglutide's hepatic gene signature. The −log10(adj pvalue) of the gene ontology (GO) category enrichment for each treatment are presented. A high value indicates a high enrichment of the GO category with a treatment, i.e., many genes in the GO category are affected by the treatment. The value "0" means that only few genes from the GO category were deregulated by the treatment.

To understand this synergistic effect, we compared the hepatic gene signatures between elafibranor, high-dose semaglutide, low-dose semaglutide and the combination of elafibranor with low-dose semaglutide. RNAseq and pathway analysis using Metascape were performed on the livers. Gene ontology analysis shows that high-dose semaglutide (10 nmol/kg/day) reverted the pathological signature induced by AMLN, in particular the inflammatory response, cytokines (IL1, IL6) production, activation and migration of immune cells (FIG. 19). Low-dose SEMA was inefficient to revert these pathways. Elafibranor (10 mg/kg/day) had a modest effect on gene ontology categories linked to inflammation and rather impacted lipid metabolism categories, a known effect of PPAR agonists. However, in combination with low-dose semaglutide, elafibranor recovered the anti-inflammatory gene signature of high-dose semaglutide, on top of its beneficial effect on lipid metabolism.

These results show that elafibranor potentiates GLP-1 receptor agonists effects on liver injury and inflammation, and represents an attractive therapeutic benefice to reduce GLP1 receptor agonists doses thereby limiting their side effects (nausea, diarrhea) that can lead to treatment discontinuation.

The invention claimed is:

1. A method for treating a condition for which the administration of a GLP-1 receptor agonist is needed comprising the administration of a combination product to a subject in need thereof,
wherein the condition is selected from the group consisting of non-alcoholic fatty liver disease, diabetes and obesity,
and wherein the combination product comprises:
(i) elafibranor or a pharmaceutically acceptable salt thereof; and
(ii) a Glucagon-like peptide-1 (GLP-1) receptor agonist selected from the group consisting of semaglutide, liraglutide and a pharmaceutically acceptable salt thereof,
wherein the amount of Glucagon-like peptide-1 (GLP-1) receptor agonist that is administered is reduced at least 1.5-fold as compared to the amount of GLP-1 agonist required when administered alone.

2. The method according to claim 1, wherein at least one side effect of the GLP-1 receptor agonist is reduced.

3. A method for the reduction of body weight comprising the administration of a combination product to a subject in need thereof, wherein the combination product comprises:
(i) elafibranor or a pharmaceutically acceptable salt thereof; and
(ii) a Glucagon-like peptide-1 (GLP-1) receptor agonist selected from the group consisting of semaglutide, liraglutide and a pharmaceutically acceptable salt thereof,
wherein the amount of Glucagon-like peptide-1 (GLP-1) receptor agonist that is administered is reduced at least 1.5-fold as compared to the amount of GLP-1 agonist required when administered alone.

4. A method for the treatment of a condition for which the administration of a GLP-1 receptor agonist is needed comprising the administration of a combination product to a subject in need thereof, wherein the amount of GLP-1 receptor agonist administered is reduced at least 1.5-fold as compared to the amount of GLP-1 receptor agonist required when the GLP-1 receptor agonist is administered alone and wherein the combination product comprises:
(i) elafibranor or a pharmaceutically acceptable salt thereof; and (ii) a Glucagon-like peptide-1 (GLP-1) receptor agonist selected from the group consisting of semaglutide, liraglutide and a pharmaceutically acceptable salt thereof.

5. A method for the treatment of a condition for which the administration of a GLP-1 receptor agonist is needed comprising the administration of a combination product to a subject in need thereof, wherein at least one adverse effect associated to GLP-1 receptor agonist is reduced as compared to when the GLP-1 receptor agonist is administered alone, wherein the combination product comprises:
(i) elafibranor or a pharmaceutically acceptable salt thereof; and
(ii) a Glucagon-like peptide-1 (GLP-1) receptor agonist selected from the group consisting of semaglutide, liraglutide and a pharmaceutically acceptable salt thereof,
wherein the amount of Glucagon-like peptide-1 (GLP-1) receptor agonist that is administered is reduced at least 1.5-fold as compared to the amount of GLP-1 agonist required when administered alone.

6. The method according to claim 1, wherein component (i) is elafibranor.

7. The method according to claim 1, wherein component (ii) is semaglutide or liraglutide.

8. The method according to claim 7, wherein component (ii) is semaglutide or a pharmaceutically acceptable salt thereof.

9. The method according to claim 7, wherein component (ii) is liraglutide or a pharmaceutically acceptable salt thereof.

10. The method according to claim 1, wherein the combination product is a composition comprising components (i) and (ii) and a pharmaceutically acceptable carrier.

11. The method according to claim 1, wherein components (i) and (ii) are formulated in a suspension, a gel, an oil, a pill, a tablet, a suppository, a powder, a capsule, an aerosol, an ointment, a cream, a patch, or a means of galenic forms for a prolonged and/or slow release.

12. The method according to claim 1, wherein the combination product is a kit of parts comprising components (i) and (ii), for sequential, separate or simultaneous use.

13. The method according to claim 12, wherein components (i) and (ii) are oral dosage forms.

14. The method according to claim 12, wherein components (i) and (ii) are pills or tablets as oral dosage forms.

15. The method according to claim 12, wherein component (i) is an oral dosage form and component (ii) is an injectable solution.

* * * * *